US011687860B2

(12) United States Patent
James

(10) Patent No.: US 11,687,860 B2
(45) Date of Patent: Jun. 27, 2023

(54) SPILL RISK ASSESSMENT FOR LIQUID STORAGE FACILITIES

(71) Applicant: New Pig Corporation, Tipton, PA (US)

(72) Inventor: Andrew Ian James, Warriors Mark, PA (US)

(*) Notice: Subject to any disclaimer, the term of this patent is extended or adjusted under 35 U.S.C. 154(b) by 692 days.

(21) Appl. No.: 15/794,323

(22) Filed: Oct. 26, 2017

(65) Prior Publication Data

US 2018/0114160 A1    Apr. 26, 2018

Related U.S. Application Data

(60) Provisional application No. 62/412,978, filed on Oct. 26, 2016.

(51) Int. Cl.
| | | |
|---|---|---|
| *G06Q 10/00* | (2012.01) | |
| *G06Q 10/0635* | (2023.01) | |
| *G06Q 10/0637* | (2023.01) | |
| *G06Q 50/04* | (2012.01) | |
| *G06Q 50/06* | (2012.01) | |

(52) U.S. Cl.
CPC ... *G06Q 10/0635* (2013.01); *G06Q 10/06375* (2013.01); *G06Q 50/04* (2013.01); *G06Q 50/06* (2013.01); *Y02P 90/30* (2015.11)

(58) Field of Classification Search
CPC combination set(s) only.
See application file for complete search history.

(56) References Cited

U.S. PATENT DOCUMENTS

| | | | | |
|---|---|---|---|---|
| 5,724,255 A | * | 3/1998 | Smith | G06F 15/025 706/920 |
| 9,043,019 B2 | | 5/2015 | Eliuk et al. | |
| 2004/0168086 A1 | | 8/2004 | Young et al. | |
| 2006/0129338 A1 | * | 6/2006 | Turley | F17D 5/00 702/51 |
| 2007/0244645 A1 | | 10/2007 | Hara et al. | |

(Continued)

FOREIGN PATENT DOCUMENTS

| | | |
|---|---|---|
| CN | 104574004 A | 4/2015 |
| CN | 104806226 A | 7/2015 |

(Continued)

OTHER PUBLICATIONS

Simmons, Spills on Flat Inclined Pavements, 2004, Pacific Northwest National Laboratory, A.2. (Year: 2004).*

(Continued)

*Primary Examiner* — Hafiz A Kassim
*Assistant Examiner* — Zahra Elkassabgi
(74) *Attorney, Agent, or Firm* — Michael D. Lazzara; Leech Tishman Fuscaldo and Lampl

(57) ABSTRACT

Tools and techniques are provided for assessing spill risk in a liquid container storage area of a facility. In one embodiment, a process includes identifying a largest capacity liquid storage container stored in the area; applying a computer-implemented algorithm for calculating a spill reach value for the largest capacity container, and calculating various kinds of risk facet values associated with the area; and generating a risk assessment summary associated with the calculated values. An improvement path can be determined in response to the calculated values, and the liquid storage area may be physically modified to reduce spill risks in the area.

19 Claims, 23 Drawing Sheets

(56) References Cited

U.S. PATENT DOCUMENTS

| | | | |
|---|---|---|---|
| 2009/0015400 A1* | 1/2009 | Breed | G07C 9/28 340/539.22 |
| 2011/0022532 A1 | 1/2011 | Kriss | |
| 2016/0371618 A1 | 12/2016 | Leidner et al. | |
| 2017/0190564 A1 | 7/2017 | Furmanczyk et al. | |

FOREIGN PATENT DOCUMENTS

| | | | | |
|---|---|---|---|---|
| JP | 2004059013 A | | 2/2004 |
| JP | 2007072753 A | | 3/2007 |
| JP | 2007220098 A | | 8/2007 |
| JP | 2013134663 A | * | 7/2013 |
| JP | 2013134663 A | | 7/2013 |
| JP | 2017188306 A | | 10/2017 |

OTHER PUBLICATIONS

Simmons, Spills on flat Inclined Pavements, 2004, Pacific Norwest National Laboratory (2004) (Year: 2004).*

International Search Report and Written Opinion dated Dec. 27, 2017 for corresponding PCT/US2017/058437.

Supplemental European Search Report and European Search Opinion dated Feb. 20, 2020, 7 pages.

* cited by examiner

Spill Preparedness Data Capture

Area Name _____

302 —
- 📷 Picture of this area name as "divider" between photos
- 📷 Picture of the overall Liquid Area

Types of liquids stored/used in this Area

304 —
- ☐ Water-based  ☐ Fuels  ☐ Aromatic solvents
- ☐ Oils, oil-based  ☐ Corrosives  ☐ Other _____
- ☐ Flammables  ☐ Oxidizers

Capacity of largest container  [    ] gals

306 —

Distance from Liquid Area to Kit  [    ] ft

308 —
- 📷 Picture from Liquid Area toward Spill Kit
  \*\*If you can't take this picture, please note general size of kit or mfr item #

Distance from Liquid Area to Drain/Escape  [    ] ft

310 —
- 📷 Picture of Drain

Distance from Drain to Blocker  [    ] ft

312 —
- 📷 Picture from Drain toward Blocker

Notes  (Product, Application, anything for us)

FIG. 3A

What type of area is this? ▾

○ Drum/IBC storgae   ○ Fuel/Fueling   ○ Hazardous waste storage
○ Battery storage    ○ Bulk storage/dispensing   ○ Waste accumulation
○ Flammable storage  ○ Safety cabinet   ○ Other What is the volume of the largest liquid storage container in this area? (In gallons)* ▾

[          ]
Please enter a value between 1 and 5000

Which are the primary types of liquids stored or used in this area? (Select all that apply) ▾

○ Water-based liquids     ○ Oils/oil-based liquids
○ Fuels/Flammables        ○ Corrosives (acids/bases)
○ Oxidizers Is there a drain within 300ft of liquid containers? ▾

○ Yes
○ No

Do you have a drain blocking or drain sealing device stored in this area? ▾

○ Yes
○ No

What does the spill kit in this area look like? ▾

○ (No Spill Kit in this Area)  ○ (<5 gals)  ○ (5-10 gals)  ○ (11-40 gals)  ○ (45-70 gals)  ○ (70+ gals)

Make your choice based on size, not contents.

Do you use secondary containment (such as containment pallets or installed berms) in this area? ▾

○ Not at all              ○ Sometimes
○ As required by regs     ○ More than required
○ Everywhere Do you give employees annual spill response training? ▾

○ Yes
○ No

Choose Your Industry ▾

[ Agriculture, Forestry and Fishing          ⇕ ]

[ GET MY SPILL KIT SNAPSHOT! ]

FIG. 3B

Sample Area 1

Input values from Data Capture:

Area Name: Sample Area 1
    $TYP_1$: Water-based
    $TYP_2$: Oil-based
    $TYP_3$: Flammables
    $TYP_4$: Oxidizers
    $LRG_{current}$: 275 gallons
    $DTK_{current}$: 40 feet
    $SKC_{current}$: 55 gallons
    $DTD_{current}$: 10 feet
    $DTB_{current}$: NA

Input values from Analyst Observation:

$SKO$: 1.1 (One obstruction or an aisle)
    $SKV_{ue}$: 3 (Clear visibility from 1 point)
    $BO$: NA
    $BV_{ue}$: NA

Calculation values:

| | |
|---|---|
| $IV_c$: 4.73 | $DTB_c$: "Not Acceptable" |
| $L_c$: 7.09 | $BV_{adj}$: 0 |
| $SD_0$: 20.04 | $BV_c$: "Not Acceptable" |
| $CSD_0$: 40.08 | $RP_{in}$: 34.22 |
| $CSD_1$: 96.21 | $RP_{post}$: "Elevated" |
| $CSD_2$: 128.28 | $SKC_{in}$: 67 |
| $ADR_c$: 0.1039, "Critical" | $CAF$: 100% |
| $DTD_{lower}$: 98 | $SKC_{post}$: 67 |
| $ICD_1$: 1 | $CA_{post}$: NA |
| $ICD_2$: 1 | $SKD_{esc}$: .5 |
| $ICD_3$: 2 | $SKD_{post}$: 17.03 |
| $ICD_4$: 3 | $CAD_{post}$: NA |
| $ICC$: 2.2 | $SKV_{ptpost}$: 3 |
| $ALR_c$: 15.4, "High" | $SKV_{ptcurr}$: 1 |
| $RP_c$: 123.82, "Very High" | $SKV_{ptadd}$: 2 |
| $SKA_c$: 1.2 | $DTB_{esc}$: .5 |
| $SKC_c$: 0.83 | $DTB_{post}$: 17.03 |
| $DTK_{adj}$: 44 | $BV_{ptpost}$: NA |
| $SKD_{rc}$: .15 | $BV_{ptadd}$: NA |
| $SKD_c$: 1.29, "Borderline" | |
| $SKV_{adj}$: 2 | |
| $SKV_c$: "Borderline" | |
| $DTB_{adj}$: NA | |
| $DTB_{rc}$: NA | |

FIG. 5A

Sample Area 1

Drum/IBC Storage Area

Water-based liquids, Oils or oil-based liquids, Flammables
Oxidizers

Liquid and Area Risks

| 10 ft | 1.1 | 4 | Medium |
|---|---|---|---|
| Liquid area to drain distance | Obstruction factor | # of liquid types | Visibility of a potential spill |
| 55 gal | 40 ft | 128 ft | Yes |
| Largest container | Spill Reach (0°) (largest container vol. of water, on flat surface) | Spill Reach (5°) (largest container vol. of water, on 5° slope) | Corr/Flammables |

| Critical | High | Very High |
|---|---|---|
| Area Drain Risk | Area Liquid Risk | Response Pressure |
| The risk that your largest container spill could reach the nearest drain | The risk of responders confusing liquid types during response, with emphasis placed on hazardous liquids | Reflects pressure a responder would face based on distance to drain, type and number of liquids, and visibility |

Drain Sealing Equip.

| NA | x NA | = NA |
|---|---|---|
| Blocker to drain distance | Obstruction factor | Effective distance to blkr. |
| Not Acceptable | Not Acceptable | Borderline |
| Blocker Distance | Blocker Visibility | Drain Condition |
| Considers spill reach, level of obstruction between drain and blocker, and Response Pressure | Considers points of visibility from drain, level of visibility, and Response Pressure | Important for drain blockers or plugs to be able to seal tightly |

Spill Kit Equipment

| 40 ft x | 1.1 = | 44 ft | 55 gal |
|---|---|---|---|
| Liquid area to spill kit | Obstruction factor | Effective distance to kit | Estimated kit absorbency |
| Very Good | Borderline | Borderline |  |
| Spill Kit Capacity | Spill Kit Distance | Spill Kit Visibility |  |
| Based on ratio of largest container to kit absorbency and distance to drain | Considers spill reach, level of obstruction between area and kit, Response Pressure, and kit mobility | Considers points of visibility from liquid area, level of visibility and Response Pressure |  |

FIG. 5B

Sample Area 2

Input values from Data Capture:

Area Name: Sample Area 2
$TYP_1$: Oil-based
$TYP_2$: Flammables
$TYP_3$: Fuels
$LRG_{current}$: 275
$DTK_{current}$: 15
$SKC_{current}$: 32
$DTD_{current}$: 67
$DTB_{current}$: 12

Input Values from Analyst Observation:

$SKO$: 1.5 (Highly obstructed)
$SKV_{un}$: 2 (Partial visibility from 1 point)
$BO$: 1 (Completely clear, line of sight)
$BV_{un}$: 5 (Clear visibility from 2+ points)

Calculation Values:

| | |
|---|---|
| $TV_c$: 23.65 | $DTB_c$: .148, "Excellent" |
| $L_s$: 15.85 | $BV_{adj}$: 5 |
| $SD_Q$: 44.82 | $BV_c$: "Excellent" |
| $CSD_Q$: 89.64 | $RP_{ia}$: 15.55 |
| $CSD_1$: 215.14 | $RP_{post}$: "Elevated" |
| $CSD_5$: 286.85 | $SKC_{ia}$: 303 |
| $ADR_{4c}$: .311, "Very High" | $CAF$: 100% |
| $DTD_{power}$: 218 | $SKC_{post}$: 303 |
| $ICD_1$: 1 | $MAX_{sk}$: 108 |
| $ICD_2$: 2 | $CA_{post}$: 195 |
| $TCC$: 1.4 | $SKD_{exc}$: .25 |
| $ALR_c$: 7, "Elevated" | $SKD_{post}$: 22 |
| $RP_c$: 84.41, "High" | $CAD_{post}$: 286.85 |
| $SKA_c$: 1.1 | $SKV_{atpost}$: 3 |
| $SKC_c$: .106, "Not Acceptable" | $SKV_{ptcurr}$: 1 |
| $DTK_{adj}$: 22.5 | $SKV_{ptadd}$: 2 |
| $SKD_{rc}$: .1 | $DTB_{exc}$: .25 |
| $SKD_c$: .250, "Excellent" | $DTB_{post}$: 20.16 |
| $SKV_{adj}$: 2 | $BV_{ptpost}$: 3 |
| $SKV_c$: "Borderline" | $BV_{ptadd}$: 0 |
| $DTB_{adj}$: 12 | |
| $DTB_{rc}$: .1 | |

FIG. 6A

Sample Area 2

Drum/IBC Storage Area

Oils or oil-based liquids, Flammables

Liquid and Area Risks

| 67 ft | 1 | 3 | High |
|---|---|---|---|
| Liquid area to drain distance | Obstruction factor | # of liquid types | Visibility of a potential spill |

| 275 gal | 90 ft | 287 ft | Yes |
|---|---|---|---|
| Largest container | Spill Reach (0°) largest container vol. of water, on flat surface) | Spill Reach (5°) largest container vol. of water, on 5° slope? | Corr/Flammables |

| Very High | Elevated | High |
|---|---|---|
| Area Drain Risk | Area Liquid Risk | Response Pressure |
| The risk that your largest container spill could reach the nearest drain | The risk of responders confusing liquid types during response, with emphasis placed on hazardous liquids | Reflects pressure a responder would face based on distance to drain, type and number of liquids, and visibility |

Drain Sealing Equip.

| 12 ft × 1 | = 12 ft | |
|---|---|---|
| Blocker to drain distance | Obstruction factor | Effective distance to blkr. |

| Excellent | Excellent | Very Good |
|---|---|---|
| Blocker Distance | Blocker Visibility | Drain Condition |
| Considers spill reach, level of obstruction between drain and blocker, and Response Pressure | Considers points of visibility from drain, level of visibility, and Response Pressure | Important for drain blockers or plugs to be able to seal tightly |

Spill Kit Equipment

| 15 ft × 1.5 | = 23 ft | 32 gal |
|---|---|---|
| Liquid area to spill kit | Obstruction factor | Effective distance to kit | Estimated kit absorbency |

| Not Acceptable | Very Good | Borderline |
|---|---|---|
| Spill Kit Capacity | Spill Kit Distance | Spill Kit Visibility |
| Based on ratio of largest container to kit absorbency and distance to drain | Considers spill reach, level of obstruction between area and kit, Response Pressure, and kit mobility | Considers points of visibility from liquid area, level of visibility and Response Pressure |

FIG. 6B

Sample Area 3

Input Values from Data Capture:
- Area Name: Sample Area 3
- $TYP_1$: Water-based
- $TYP_2$: Oil-based
- $TYP_3$: Fuels
- $TYP_4$: Corrosives
- $TYP_5$: Oxidizers
- $LRG_{current}$: 375
- $DTK_{current}$: 30
- $SKC_{current}$: 75
- $DTD_{current}$: 312
- $DTB_{current}$: 20

Input Values from Analyst Observation:

- $SKO$: 1.2 (A few obstructions, somewhat straight path)
- $SKV_{ap}$: 4 (Clear visibility from two points)
- $BO$: 1.1 (One obstruction or an aisle)
- $BV_{ap}$: 5 (Clear visibility from 2+ points)

Calculation Values:

| | |
|---|---|
| $TV_c$: 32.25 | $DTB_{pc}$: .1 |
| $L_z$: 52.33 | $DTB_z$: .2335 |
| $SD_0$: 52.33 | $BV_{adj}$: 5 |
| $CSD_0$: 104.67 | $BV_c$: "Excellent" |
| $CSD_1$: 251.23 | $RP_{jo}$: 57.77 |
| $CSD_5$: 334.97 | $RP_{post}$: "High" |
| $ADR_{aq}$: 1.2418, "Lower" | $SKC_{jo}$: 268 |
| $DTD_{Lower}$: 254 | $CAF$: 100% |
| $ICD_1$: 1 | $SKC_{post}$: 108 |
| $ICD_2$: 1 | $MAX_{sk}$: 108 |
| $ICD_3$: 2 | $CA_{post}$: 80 |
| $ICD_4$: 3 | $SKD_{exc}$: 20 |
| $ICD_5$: 3 | $SKD_{post}$: 20 |
| $TCC$: 2.6 | $CAD_{post}$: 334.97 |
| $AIR_c$: 26, "High" | $SKV_{ptpost}$: 3 |
| $RP_c$: 57.77, "High" | $SKV_{ptexc}$: 2 |
| $SKA_c$: 1 | $SKV_{ptadd}$: 1 |
| $SKC_c$: .2, "Not Acceptable" | $DTB_{exc}$: 20 |
| $DTK_{adj}$: 36, "Very Good" | $DTB_{post}$: 20 |
| $SKD_c$: .1 | $BV_{post}$: 3 |
| $SKD_2$: .3821 | $BV_{ptadd}$: 0 |
| $SKV_{adj}$: 4 | |
| $SKV_c$: "Very Good" | |
| $DTB_{adj}$: 22, "Very Good" | |

FIG. 7A

Sample Area 3

Drum/IBC Storage Area

Water-based liquids, Oils or oil-based liquids, Fuels, Corrosives, Oxidizers

Liquid and Area Risks

| 312 ft | 1 | 5 | High |
|---|---|---|---|
| Liquid area to drain distance | Obstruction factor | # of liquid types | Visibility of a potential spill |

| 375 gal | 105 ft | 335 ft | Yes |
|---|---|---|---|
| Largest container (largest container vol. of water, on flat surface) | Spill Reach (0°) | Spill Reach (5°) (largest container vol. of water, on 5° slope) | Corr/Flammables |

| Lower | High | High |
|---|---|---|
| Area Drain Risk | Area Liquid Risk | Response Pressure |
| The risk that your largest container spill could reach the nearest drain | The risk of responders confusing liquid types during response, with emphasis placed on hazardous liquids | Reflects pressure a responder would face based on distance to drain, type and number of liquids, and visibility |

Drain Sealing Equip.

| 20 ft | × 1.1 | = 22 ft |
|---|---|---|
| Blocker to drain distance | Obstruction factor | Effective distance to blkr. |

| Very Good | Excellent | Very Good |
|---|---|---|
| Blocker Distance | Blocker Visibility | Drain Condition |
| Considers spill reach, level of obstruction between drain and blocker, and Response Pressure | Considers points of visibility from drain, level of visibility, and Response Pressure | Important for drain blockers or plugs to be able to seal tightly |

Spill Kit Equipment

| 30 ft | × 1.2 | = 36 ft | 75 gal |
|---|---|---|---|
| Liquid area to spill kit | Obstruction factor | Effective distance to kit | Estimated kit absorbency |

| Not Acceptable | Very Good | Very Good |
|---|---|---|
| Spill Kit Capacity | Spill Kit Distance | Spill Kit Visibility |
| Based on ratio of largest container to kit absorbency and distance to drain | Considers spill reach, level of obstruction between area and kit, Response Pressure, and kit mobility | Considers points of visibility from liquid area, level of visibility and Response Pressure |

<u>FIG. 7B</u>

Sample Area 4

Input Values from Data Capture:

> Area Name: Sample Area 4
> $TYP_1$: Water-based
> $TYP_2$: Oil-based
> $LRG_{current}$: 4
> $DTK_{current}$: 40
> $SKC_{current}$: 1
> $DTD_{current}$: 15
> $DTB_{current}$: 307

Input Values from Analyst Observation:

> $SKO$: 1.2 (A few obstructions, somewhat straight path)
> $SKV_{in}$: 4 (Clear visibility from two points)
> $BO$: 1.1 (One obstruction or an aisle)
> $BV_{in}$: 5 (Clear visibility from 2+ points)

Calculation Values:

| | |
|---|---|
| $TV_c$: .3440 | $DTB_{xc}$: .1 |
| $L_c$: 1.912 | $DTB_c$: 34.70, "Not Acceptable" |
| $SD_0$: 5.405 | $BV_{adj}$: 5 |
| $CSD_R$: 10.81 | $BV_c$: "Excellent" |
| $CSD_L$: 25.94 | $RP_{in}$: 6.22 |
| $CSD_S$: 34.59 | $RP_{post}$: "Lower" |
| $ADR_{sc}$: .5781, "Elevated" | $SKC_{in}$: 5 |
| $DTD_{lowest}$: 27 | $CAF$: 100% |
| $ICD_1$: 1 | $SKC_{post}$: 5 |
| $ICD_2$: 1 | $MAX_{sk}$: 108 |
| $TCC$: 1.4 | $CA_{post}$: 0 |
| $ALR_c$: 2.8, "Moderate" | $SKD_{xc}$: 1 |
| $RP_c$: 48.41, "Elevated" | $SKD_{post}$: 9 |
| $SKA_c$: 1 | $CAD_{post}$: NA |
| $SKC_c$: .25, "Not Acceptable" | $SKV_{inpost}$: 3 |
| $DTK_{adj}$: 48 | $SKV_{stcurr}$: 2 |
| $SKD_{xc}$: .1 | $SKV_{stadj}$: 1 |
| $SKD_c$: 4.933, "Not Acceptable" | $DTB_{exc}$: 1 |
| $SKV_{in}$: 4 | $DTB_{post}$: 9 |
| $SKV_{adj}$: 4 | $BV_{stpost}$: 3 |
| $SKV_c$: "Very Good" | $BV_{stadj}$: 0 |
| $BO$: 1.1 | |
| $DTB_{adj}$: 337.7 | |

FIG. 8A

Sample Area 4

Drum/IBC Storage Area

Water-based liquids, Oils or oil-based liquids

Liquid and Area Risks

| 15 ft | 1 | 2 | High |
|---|---|---|---|
| Liquid area to drain distance | Obstruction factor | # of liquid types | Visibility of a potential spill |

| 4 gal | 11 ft | 35 ft | Yes |
|---|---|---|---|
| Largest container | Spill Reach (0°) (largest container vol. of water, on flat surface) | Spill Reach (5°) (largest container vol. of water, on 5° slope) | Corr/Flammables |

| Elevated | Moderate | High |
|---|---|---|
| Area Drain Risk | Area Liquid Risk | Response Pressure |
| The risk that your largest container spill could reach the nearest drain | The risk of responders confusing liquid types during response, with emphasis placed on hazardous liquids | Reflects pressure a responder would face based on distance to drain, type and number of liquids, and visibility |

Drain Sealing Equip.

307 ft $\times$ 1.1 = 338 ft

| Blocker to drain distance | Obstruction factor | Effective distance to blkr. |
|---|---|---|
| Not Acceptable | Excellent | Very Good |
| Blocker Distance | Blocker Visibility | Drain Condition |
| Considers spill reach, level of obstruction between drain and blocker, and Response Pressure | Considers points of visibility from drain, level of visibility, and Response Pressure | Important for drain blockers or plugs to be able to seal tightly |

Spill Kit Equipment

40 ft $\times$ 1.2 = 48 ft  1 gal

| Liquid area to spill kit | Obstruction factor | Effective distance to kit | Estimated kit absorbency |
|---|---|---|---|
| Not Acceptable | Not Acceptable | | Very Good |
| Spill Kit Capacity | Spill Kit Distance | | Spill Kit Visibility |
| Based on ratio of largest container to kit absorbency and distance to drain | Considers spill reach, level of obstruction between area and kit, Response Pressure, and kit mobility | | Considers points of visibility from liquid area, level of visibility and Response Pressure |

FIG. 8B

Sample Area 5

Input Values from Data Capture:

Area Name: Sample Area 5
    $TYP_1$: Water-based
    $LRG_{current}$: 2500
    $DTK_{current}$: 258
    $SKC_{current}$: 200
    $DTD_{current}$: 401
    $DTB_{current}$: 20

Input Values from Analyst Observation:

$SKO$: 1.5 (Highly obstructed)
    $SKV_{ob}$: 4 (Clear visibility from two points)
    $BO$: 1.1 (One obstruction or an aisle)
    $BV_{ob}$: 5 (Clear visibility from 2+ points)

Calculation Values:

| | |
|---|---|
| $TV_c$: 215.00 | $DTB_c$: .0856 |
| $L_c$: 47.81 | $BV_{adj}$: 5 |
| $SD_B$: 135.14 | $BV_c$: "Excellent" |
| $CSD_0$: 270.28 | $RP_{ib}$: 2.222 |
| $CSD_1$: 648.67 | $RP_{post}$: "Lower" |
| $CSD_5$: 864.90 | $CAF$: 1000 gallons cap |
| $ADR_{bk}$: .6181, "Elevated" | $SKC_{post}$: 1000 |
| $DTD_{lower}$: 656 | $MAX_{bk}$: 108 |
| $ICD_1$: 1 | $CA_{post}$: 892 |
| $TCC$: 1 | $SKD_{exc}$: 10 |
| $ALR_c$: 1, "Lower" | $SKD_{ppst}$: 10 |
| $RP_c$: 40.40, "Elevated" | $CAD_{post}$: 865 |
| $SKA_c$: 1 | $SKV_{ptpost}$: 3 |
| $SKC_c$: .08, "Not Acceptable" | $SKV_{ptsurr}$: 2 |
| $DTK_{adj}$: 387, "Not Acceptable" | $SKV_{ptadd}$: 1 |
| $SKD_{xc}$: .05 | $DTB_{exc}$: 10 |
| $SKD_c$: 1.507 | $DTB_{post}$: 10 |
| $SKV_{adj}$: 4 | $BV_{ptpost}$: 3 |
| $SKV_c$: "Very Good" | $BV_{ptadd}$: 0 |
| $BO$: 1.1 | |
| $DTB_{adj}$: 22, "Good" | |
| $DTB_c$: .05 | |

FIG. 9A

Sample Area 5

Drum/IBC Storage Area

Liquid and Area Risks

Water-based liquids

| 401 ft | 1 | 1 | High |
|---|---|---|---|
| Liquid area to drain distance | Obstruction factor | # of liquid types | Visibility of a potential spill |

| 2500 gal | 270 ft | 865 ft | No |
|---|---|---|---|
| Largest container | Spill Reach (0°) (largest container vol. of water, on flat surface) | Spill Reach (5°) (largest container vol. of water, on 5° slope) | Corr/Flammables |

| Elevated | Lower | Elevated |
|---|---|---|
| Area Drain Risk | Area Liquid Risk | Response Pressure |
| The risk that your largest container spill could reach the nearest drain | The risk of responders confusing liquid types during response, with emphasis placed on hazardous liquids | Reflects pressure a responder would face based on distance to drain, type and number of liquids, and visibility |

Drain Sealing Equip.

20 ft × 1.1 = 22 ft

| Blocker to drain distance | Obstruction factor | Effective distance to blkr. |
|---|---|---|
| Good | Excellent | Very Good |
| Blocker Distance | Blocker Visibility | Drain Condition |
| Considers spill reach, level of obstruction between drain and blocker, and Response Pressure | Considers points of visibility from drain, level of visibility, and Response Pressure | Important for drain blockers or plugs to be able to seal tightly |

Spill Kit Equipment

258 ft × 1.5 = 387 ft    200 gal

| Liquid area to spill kit | Obstruction factor | Effective distance to kit | Estimated kit absorbency |
|---|---|---|---|
| Not Acceptable | Not Acceptable | | Very Good |
| Spill Kit Capacity | Spill Kit Distance | | Spill Kit Visibility |
| Based on ratio of largest container to kit absorbency and distance to drain | Considers spill reach, level of obstruction between area and kit, Response Pressure, and kit mobility | | Considers points of visibility from liquid area, level of visibility and Response Pressure |

FIG. 9B

Fueling and Rail Area

Fueling Area

Liquid and Area Risks

Flammable, Oils or Oil-based Liquids

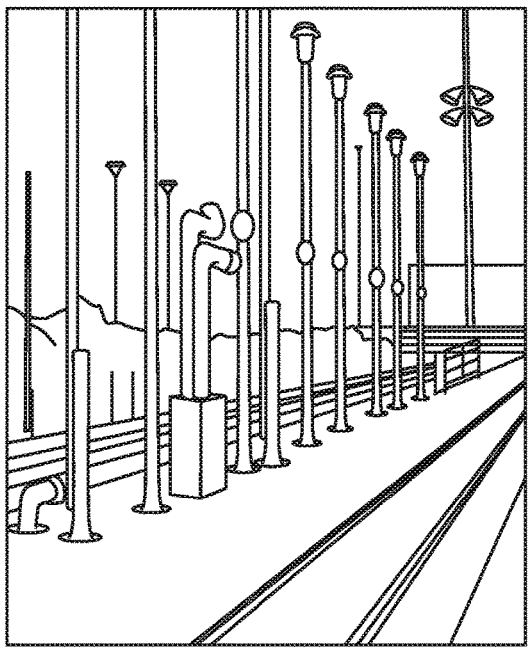

| 32 ft | 1 | 2 | High |
|---|---|---|---|
| Liquid area to drain distance | Obstruction factor | # of liquid types | Visibility of a potential spill |

| 250 gal | 85 ft | 274 ft | Yes |
|---|---|---|---|
| Largest container | Spill Reach (0°) (largest container vol. of water, on flat surface) | Spill Reach (5°) (largest container vol. of water, on 5° slope) | Corr/Flammables |

| Critical | Elevated | High |
|---|---|---|
| Area Drain Risk | Area Liquid Risk | Response Pressure |
| The risk that your largest container spill could reach the nearest drain | The risk of responders confusing liquid types during response, with emphasis placed on hazardous liquids | Reflects pressure a responder would face based on distance to drain, type and number of liquids, and visibility |

Drain Sealing Equip.

| N/A | x N/A | = N/A |  |
|---|---|---|---|
| Blocker to drain distance | Obstruction factor | Effective distance to blkr. | |

| N/A | N/A | N/A |
|---|---|---|
| Blocker Distance | Blocker Visibility | Drain Condition |
| Considers spill reach, level of obstruction between drain and blocker, and Response Pressure | Considers points of visibility from drain, level of visibility, and Response Pressure | Important for drain blockers or plugs to be able to seal tightly |

Spill Kit Equipment

| 0 ft | x 2 | = 0 ft | 10 gal |
|---|---|---|---|
| Liquid area to spill kit | Obstruction factor | Effective distance to kit | Estimated kit absorbency |

| Not Acceptable | Excellent | Excellent |
|---|---|---|
| Spill Kit Capacity | Spill Kit Distance | Spill Kit Visibility |
| Based on ratio of largest container to kit absorbency and distance to drain | Considers spill reach, level of obstruction between area and kit, Response Pressure, and kit mobility | Considers points of visibility from liquid area, level of visibility and Response Pressure |

Notes

While the spill kit in this area is of the appropriate size, it appears to have been pilfered some time ago, reducing effective capacity to somewhere in the 10 gallon range. Typically, when we see pilferage, especially outdoors it signals a need for a separate supply of incidental spill supplies. This is quite common. The Area Drain Risk is Critical due to the fact that there is an open storm drain 32 feet from the area, a distance where a spill far smaller than a saddle tank could easily reach, especially during a rain or snow event. So, we will want to look not only at outdoor appropriate absorbents (Oil Only), but also a means of blocking the drain in this area quickly in the event of a spill.

FIG. 10

Building 35 Parts Washer

Fleet/garage shop
Oils or oil based liquids

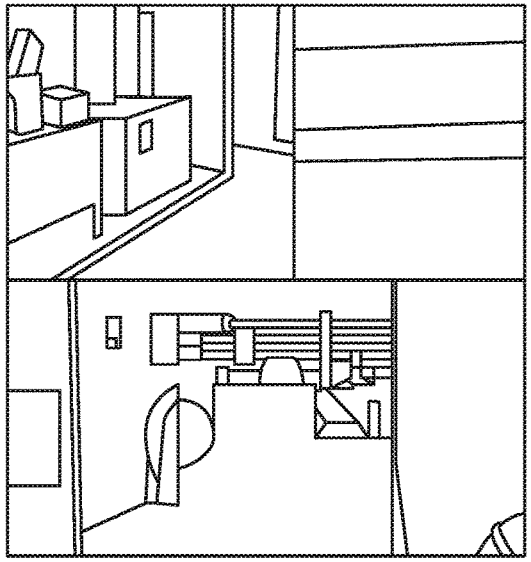

Liquid and Area Risks

| 41 ft | 1.1 | 1 | Medium |
|---|---|---|---|
| Liquid area to drain distance | Obstruction factor | # of liquid types | Visibility of a potential spill |
| 100 gal | 54 ft | 173 ft | No |
| Largest container | Spill Reach (0°) (largest container vol. of water, on flat surface) | Spill Reach (5°) (largest container vol. of water, on 5° slope) | Corr/Flammables |
| Very High | Lower | High | |
| Area Drain Risk | Area Liquid Risk | Response Pressure | |
| The risk that your largest container spill could reach the nearest drain | The risk of responders confusing liquid types during response, with emphasis placed on hazardous liquids | Reflects pressure a responder would face based on distance to drain, type and number of liquids, and visibility | |

Drain Sealing Equip.

| N/A | x N/A | = N/A |
|---|---|---|
| Blocker to drain distance | Obstruction factor | Effective distance to blkr. |
| N/A | N/A | Excellent |
| Blocker Distance | Blocker Visibility | Drain Condition |
| Considers spill reach, level of obstruction between drain and blocker, and Response Pressure | Considers points of visibility from drain, level of visibility, and Response Pressure | Important for drain blockers or plugs to be able to seal tightly |

Spill Kit Equipment

| 11 ft | x 2 | = 22 ft | 20 gal |
|---|---|---|---|
| Liquid area to spill kit | Obstruction factor | Effective distance to kit | Estimated kit absorbency |
| Not Acceptable | Borderline | Not Acceptable | |
| Spill Kit Capacity | Spill Kit Distance | Spill Kit Visibility | |
| Based on ratio of largest container to kit absorbency and distance to drain | Considers spill reach, level of obstruction between area and kit, Response Pressure, and kit mobility | Considers points of visibility from liquid area, level of visibility and Response Pressure | |

While parts washer failures are relatively rare, it is important that this model is not a double containment wall model (few are). Treating the parts washer as a 100 gallon tank, we see that a spill or puncture would have a realistic chance of reaching the trench drain, especially when considering that the drain likely has a degree or two of slope into it. We estimated kit as 20 gallons of absorbent capacity, which would be below ideal, and visibility is an issue, as it is completely hidden from view by a door. Because this is an MRO area, we will also recommend keeping an incidental supply of absorbents and wipers separate from spill lot to help ensure that the spill kit remains sealed and stocked

FIG. 12

Overall View of Risks and Potential Improvements
Facility-wide Averages

Before Improvement Path

| Area Drain Risk | Area Liquid Risk | Response Pressure |
|---|---|---|
| Very High | Moderate | High |

| Spill Kit Capacity | Spill Kit Distance | Spill Kit Visibility |
|---|---|---|
| Not Acceptable | Borderline | Not Acceptable |

After Improvement Path

| Area Drain Risk | Area Liquid Risk | Response Pressure |
|---|---|---|
| Lower | Moderate | Moderate |

| Spill Kit Capacity | Spill Kit Distance | Spill Kit Visibility |
|---|---|---|
| Excellent | Excellent | Excellent |

Table of Risk Counts for Your Facility

| | Before Improvement Path | | | | | | After Improvement Path | | | | | |
|---|---|---|---|---|---|---|---|---|---|---|---|---|
| | Drain Risk | Liquid Risk | Response P. | Kit Capacity | Kit Distance | Kit Visibility | Drain Risk | Liquid Risk | Response P. | Kit Capacity | Kit Distance | Kit Visibility |
| Critical Risks | 1 | 0 | 1 | | | | 0 | 0 | 0 | | | |
| Very High Risk | 4 | 0 | 0 | | | | 0 | 0 | 0 | | | |
| High Risk | 0 | 0 | 4 | | | | 0 | 0 | 0 | | | |
| Elevated Risk | 0 | 3 | 0 | | | | 0 | 3 | 3 | | | |
| Moderate Risk | 0 | 0 | 0 | | | | 0 | 0 | 0 | | | |
| Lower Risk | 1 | 3 | 1 | | | | 6 | 3 | 3 | | | |
| Spill Kit Facts | | | | | | | | | | | | |
| Not Acceptable | | | | 5 | 4 | 5 | | | | 0 | 0 | 0 |
| Borderline | | | | 0 | 1 | 0 | | | | 0 | 0 | 0 |
| Good | | | | 1 | 0 | 1 | | | | 0 | 0 | 0 |
| Very Good | | | | 0 | 0 | 0 | | | | 0 | 0 | 0 |
| Excellent | | | | 0 | 1 | 0 | | | | 6 | 6 | 6 |

FIG. 15

SPILL RISK ASSESSMENT FOR LIQUID STORAGE FACILITIES

CROSS-REFERENCE TO RELATED APPLICATIONS

This application claims the benefit of U.S. Provisional Application No. 62/412,978, filed Oct. 26, 2016, the entirety of which is hereby incorporated by reference into the present application.

FIELD OF THE INVENTION

In various embodiments, the present invention generally relates to tools, techniques, and algorithms for assessing liquid spill risk for areas in which liquids are stored. In more specific embodiments, the present invention relates to assessing and quantifying spill risk for an area or facility in which containers of liquid have been stored.

BACKGROUND

Many commercial enterprises employ a variety of liquids in their processes and operations. For example, entities in the manufacturing, fuel distribution, and chemical plant sectors may use many different kinds of liquids in their industrial processes. Proper spill management for liquids and their storage containers is crucial for these enterprises, especially with respect to hazardous or toxic liquids which may require special precautions and careful handling. Spilled liquids can cause harm to personnel, damage to property and equipment, and adversely impact a company from financial and legal liability perspectives.

However, many facilities have no defined, unified view of the risks represented by a given liquid storage area, let alone across an entire facility or across multiple storage facilities within an organization. Even the most engaged and sophisticated facilities typically rely on a few "rule of thumb" guidelines to benchmark spills. Unfortunately, such guidelines have limited applicability and even when consistently applied can often cause more harm than good. For example, a facility might perform a test by spilling a five-gallon bucket in its parking lot, measuring a ten-foot radius spread for the liquid, and then creating a liquid spill guideline that every gallon of the liquid spreads two feet. While that may be approximately true for a five-gallon bucket, applying the same guideline to a 275-gallon intermediate bulk container (IBC) could result in a spill radius which is incorrectly and excessively inflated. Because many facilities do not have the resources, knowledge, or inclination to apply advanced mathematics to their spill risk assessments, they instead may inappropriately apply flawed guidelines or ignore the risks altogether.

Even with regard to sophisticated facilities who possess an enhanced understanding of their liquid spill risks, staging even a benign test spill of a "harmless" liquid like water may be infeasible because of delicate electronics or equipment, the potential for slip and fall injuries, production downtime, and cleanup labor/materials. Usually the higher risk spill areas in a facility are also of higher commercial significance, and thus are often the most difficult in which to stage practical experiments or test spills.

These issues are further compounded by the fact that federal, state, and local laws and regulations are often loosely defined yet can have significant potential negative legal and financial impacts on the facility. For example, within the text of certain regulations facilities must follow with regard to spill kit preparedness, ambiguous terms such as "sufficient quantities" or "in areas where spills, leaks or ruptures may occur" are used. Because there may be no logic, calculation, table of acceptable values, or other objective measures to gage compliance, the laws and regulations are typically open to significant interpretation by facility management which can expose the company to significant legal liability.

In view of the above problems, what are needed are enhanced tools, techniques, and algorithms which can provide an analytical framework by which facilities can evaluate the risks associated with whether an area is realistically and competently prepared for a liquid spill in the area.

SUMMARY

Tools, techniques, and algorithms are provided which reflect an analytical framework and logical approach by which facilities can evaluate the risks associated with their liquid storage areas. In various embodiments, an algorithm can be used to perform a spill risk assessment and to generate an improvement path in the response to the assessment. The results of the risk assessment can be translated into physical changes to transform the storage area to reduce future spill risk.

In one embodiment, a method is provided for assessing spill risk in a liquid storage area having at least one liquid storage container stored therein. The method may involve receiving input data associated with a largest capacity liquid storage container stored in the area; applying, with a processor of a computer system, a computer-implemented algorithm programmed for: calculating a spill reach value for the largest capacity container, and calculating at least one risk facet value associated with the area; and outputting, by the processor, a risk assessment summary associated with at least the calculated spill reach value and the calculated risk facet value.

The method may comprise determining, by the processor, an improvement path in response to the calculated spill reach value and the calculated risk facet value; and, physically modifying at least a portion of the liquid storage area in response to at least a portion of the determined improvement path. In certain embodiments, the method may further comprise calculating multiple spill reach values for the largest capacity container in response to multiple surface slopes. In one aspect, the algorithm may be programmed for calculating the spill reach value for the largest capacity container in response to a type of fluid. In various embodiments, the risk facet value may include one or more of an area drain risk value, area liquid risk value, response pressure value, a spill kit capacity value, a spill kit distance value, a spill kit visibility value, a blocker distance value, a blocker visibility value, a drain condition determination, or combinations thereof.

BRIEF DESCRIPTION OF THE FIGURES

FIGS. 3A and 3B include examples of input data capture worksheets.

FIGS. 5A, 6A, 7A, 8A and 9A include a tabulation of input data and calculated values associated with various liquid storage areas.

FIGS. 5B, 6B, 7B, 8B and 9B include output screen displays illustrating results connected with the calculated values associated with FIGS. 5A, 6A, 7A, 8A and 9A (respectively).

FIG. 10 includes an example of an output screen associated with a fueling and rail area.

FIG. 12 illustrates an example of an output screen associated with a parts washer area in a building.

FIG. 15 includes an example of an output screen associated with developing improvement paths with a particular liquid storage area, including a numerical count of risk facets both before and after the improvement path has been implemented.

DESCRIPTION

Figure 1:
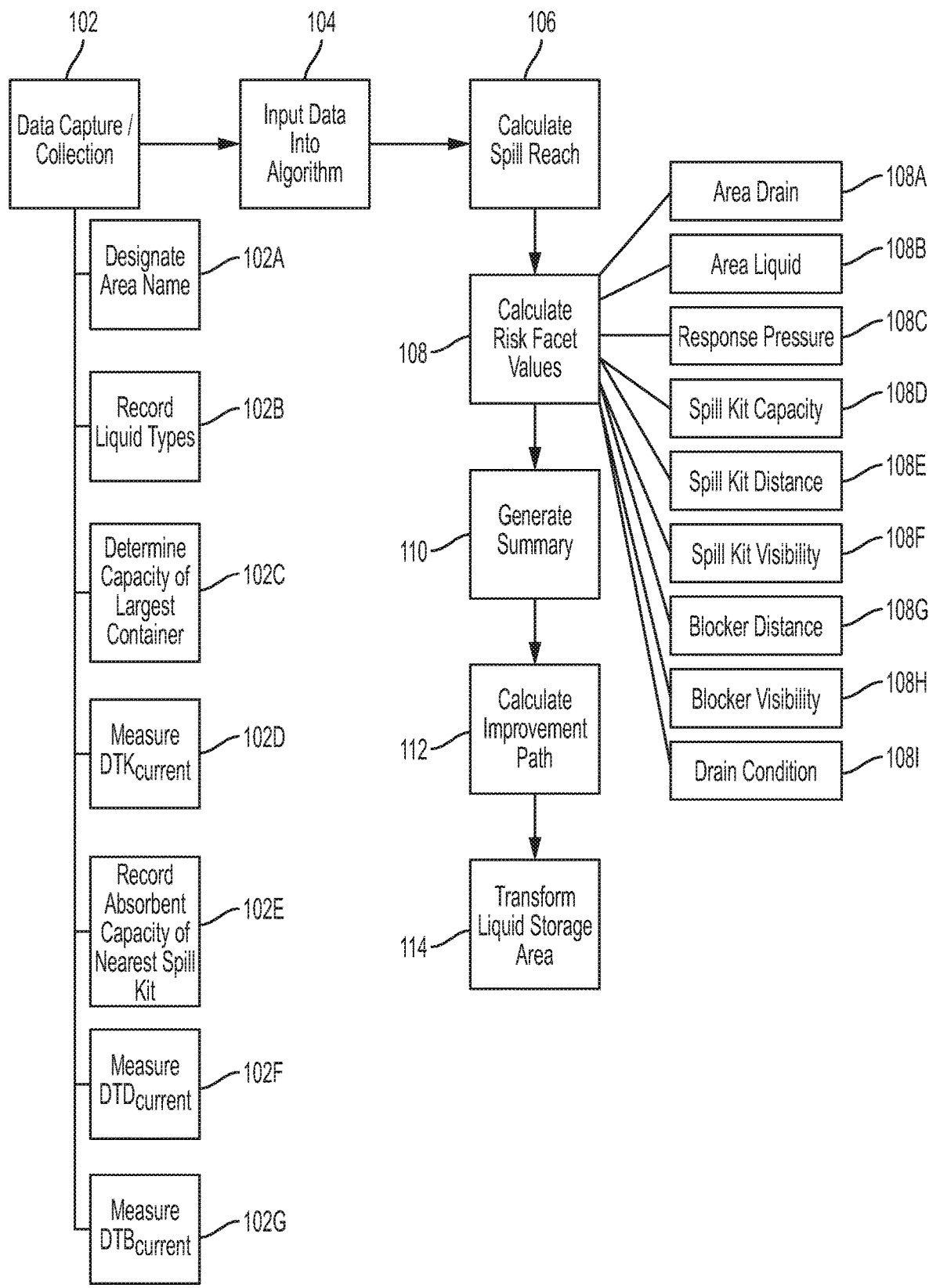
FIG. 1 includes an example of a process flow diagram for performing a spill risk assessment in accordance with various embodiments of the invention.

The inventors have developed enhanced tools, techniques, and algorithms which can provide an analytical framework and logic by which facilities can evaluate the risks associated with whether an area is realistically and competently prepared for a spill involving liquid stored in the area. In various embodiments, the invention satisfies long felt needs in the industry by addressing problems that have plagued the industry for an extended period of time.

For example, embodiments of a spill risk assessment algorithm described herein can significantly alleviate or resolve many issues in different kinds of facilities which employ liquids in their operations. In one aspect, the algorithm creates a developed, robust, and universal view of spill-related risks. By building on a physics-based model for liquid spills occurring at a facility, the algorithm provides a measured and measurable view of spill-related risks. Prior to the development of this algorithm, facilities had no defined, unified view of the risks represented in a given liquid storage area, let alone across an entire facility or across multiple facilities within the same enterprise.

The algorithm can reduce or eliminate the practice of rough estimation or "rule of thumb" type guidelines for assessing spill behaviors. Because many facilities do not have the time, knowledge, or other resources necessary to apply advanced mathematics to liquid spill assessments, they instead apply flawed guidelines or ignore the risks altogether. The algorithm also allows for acquiring knowledge of spill behavior in areas where staging a controlled spill is infeasible and/or dangerous. Using the present algorithm can take the place of or supplement performing spills tests where even "harmless" liquids such as water can cause significant damage to equipment or risk of injury to employees.

In addition, the algorithm can be used to develop tactical and specific knowledge to help facilities comply with otherwise vague local, state and federal environmental rules, regulations, and laws. Therefore, use of the algorithm can assist a facility with reducing negative impact in the form of adverse financial consequences or legal liability.

In various embodiments, the algorithm reflects objective tools and techniques which facilities can use to evaluate if a liquid area is adequately prepared for a spill of its comparatively largest container. The algorithm can also be used to improve a liquid storage container area and to develop a coherent approach to spill response preparations. The algorithms and tools described herein can be embodied as computer-implemented instructions stored on a mobile device, smartphone, desktop computer system, tablet, laptop, or other computing device. In one example, an algorithm can be used to calculate spill related risks associated with a liquid container storage area. In certain embodiments, spill related risks may be assessed in connection with a number of available emergency spill kits or spill response kits, for example, among other aspects of a given liquid storage area.

Figure 2:
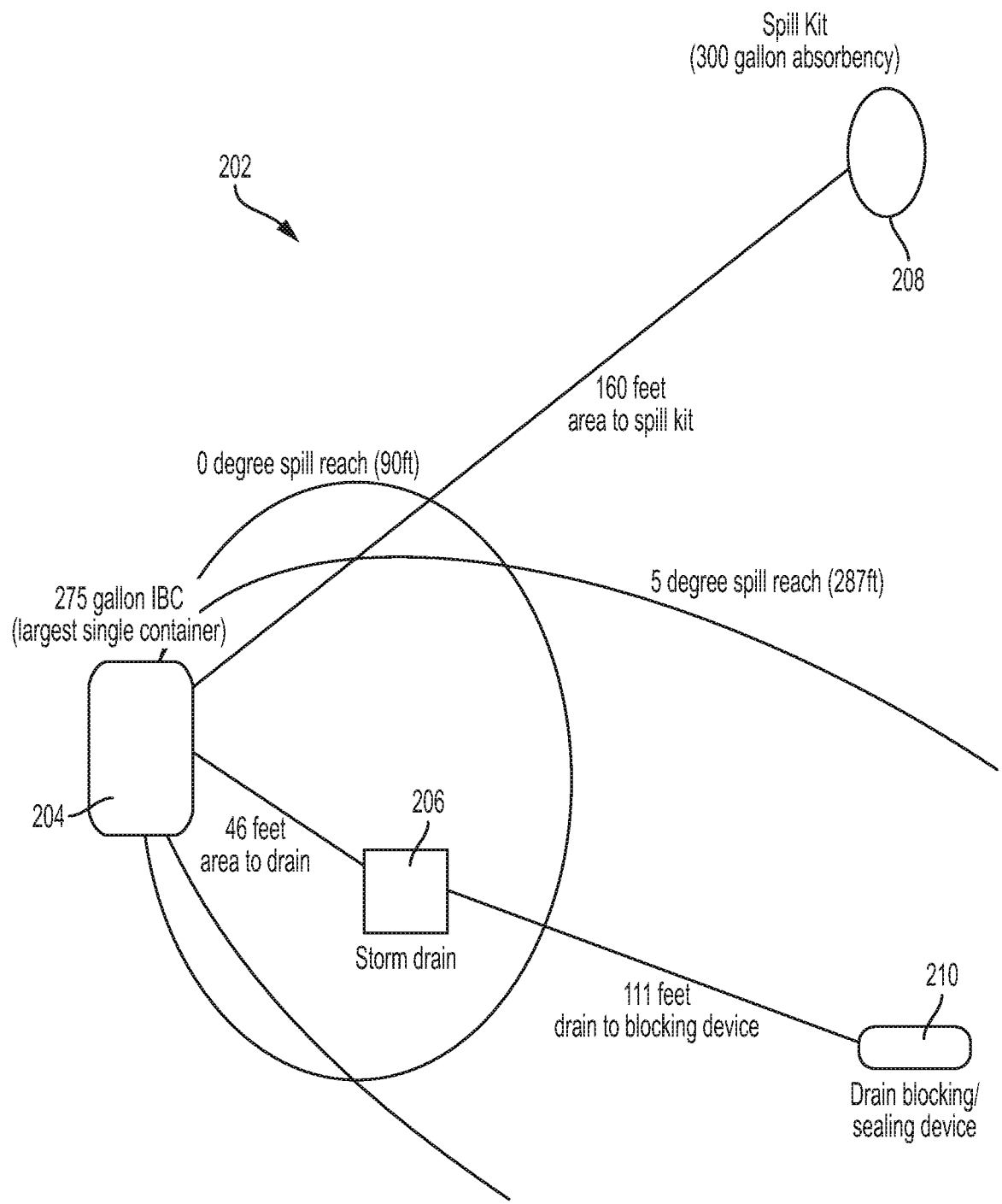
FIG. 2 schematically displays an example of a liquid storage area.

FIG. 1 illustrates one example of an embodiment of a method for assessing liquid spill risk within an area of interest in accordance with various embodiments of the present invention. FIG. 2 schematically illustrates an example of a storage area 202 which can be analyzed by a risk spill assessment algorithm. In the example shown, the area 202 includes a liquid storage container 204 which has been determined to be the comparatively largest single container (e.g., by capacity or volume) within the area 202, for example. The area 202 further includes a drain 206 (e.g., storm drain) which may connect to a sewer system external to the area 202. A spill kit 208 can be provided in the area 202 to allow personnel in the area 202 to address a spill event involving liquid the container 204, for example. Also, a drain blocking device 210 can be provided to cover or seal the drain 206 during a container spill event.

At step 102, various input data associated with the storage area 202 can be captured or collected by an analyst or measurement device, for example. FIG. 3A illustrates one example of a data capture worksheet which can be used to capture input data for the area 202. FIG. 3B illustrates a different example of a data capture worksheet which can be accessed online through a computer or computing device, for example. As shown, the area 202 may be given a name 302 or other identifier at step 102A, and one or more photos or other images associated with the area 202 can be captured. In certain embodiments, one or more standardized names may be used to classify areas and facilities to facilitate perform meta-analysis across multiple facilities.

At step 102B, the types of liquids 304 stored in the area 202 (e.g., represented as variables $TYP_1$, $TYP_2$, $TYP_3$, etc.) may be recorded. The type of liquid may be defined and categorized from a variety of different liquids, such as water-based; oils, oil-based; flammables; fuels; corrosives; oxidizers; aromatic solvents; as well as another flexible class for other kinds of liquids (e.g., "Others"). Those skilled in the art can appreciate that an analyst may determine the best fit for liquid type designation for the given liquid or liquids stored in the area 202.

At step 102C, a capacity 306 of the largest container ($LRG_{current}$) in the area 202, when there are multiple containers in the area 202, can be determined. The capacity 306 may be quantified as a volume (e.g., gallons or liters), for example. Collection of capacity data 306 recognizes that if the largest capacity container 204 is spilled in a worst-case, realistic scenario, then this container 204 would result in the largest spill radius, which is of primary consideration in understanding and calculating risks. Calculated spill radius derived from this largest volume container 204 plays a significant role in understanding risks and problem resolutions throughout the processing of the algorithm (see below).

At step 102D, a distance from liquid area to kit ($DTK_{current}$) value 308 between the container 204 and the nearest spill kit 208 can be measured and recorded. This input data captures how far away the nearest emergency spill response supplies are from the location of the liquid stored in the container 204. Related calculations evaluate the accessibility of these essential supplies in the event of a liquid spill event.

At step 102E, a value for absorbent capacity of nearest spill kit ($SKC_{current}$) can be recorded. This input allows for the effective understanding of observed in situ spill kit absorbent capacity and its suitability given the risks and settings in the liquid storage area 202.

At step 102F, a distance from liquid area to drain/escape ($DTD_{current}$) value 310 between the container 204 and the nearest drain 206 can be measured and recorded. This input data captures how far away the nearest potential escape point for liquid is from the liquid storage container 204. This data represents a point where, if the liquid reaches the drain 206, then the spill will be unrecoverable or challenging to clean up, and the spill will likely involve regulatory penalties and/or significant cost or complexity to resolve.

At step 102G, a distance from drain to blocker ($DTB_{current}$) value 312 between the container 204 and the nearest drain blocker 210 can be measured and recorded. This input data captures how far away the nearest drain sealing device is from the drain. This distance is important because it is used to calculate how quickly and adequately a drain could be sealed in the event of a spill that could potentially reach the drain.

Input data processed by the various methods and algorithms described herein can be entered manually by an operator, downloaded from an external data source, and/or can be collected automatically by one or more types of sensors, measurement tools, or other devices programmed to capture or collect the input data. In certain embodiments, input data may represent a digital or informational transformation of a state, dimension, quality, or other aspect of a physical object or tangible article. In the process of collecting input data for use by a spill risk assessment algorithm, a variety of devices or equipment may be used. For example, a digital camera of sufficient resolution can be used to provide different images or viewpoints of a liquid storage area. For example, and as described below in more detail, a camera can be used to capture specific visual information and vantage points necessary for an analyst to derive values for spill kit obstruction factor, spill Kit visibility, blocker obstruction factor, and blocker visibility. A laser measure with supplemental means of targeting in addition to the laser trace can also be used to obtain distance measurements, for example. Distances in a facility may vary significantly, ranging from a few feet to hundreds of feet, which makes laser-based measurement devices desirable for collecting data. Furthermore, the laser can be used to qualitatively evaluate the number of obstructions along a straight path, and the presence of such obstructions may be used to modify distance values. The supplemental means of targeting can be helpful, as many of the storage areas are outdoors and in bright sunlight, for example, where observing the laser trace over longer distances can be challenging, even with special laser glasses. For this reason, in certain embodiments, a device comprising a laser-aligned camera and crosshair with variable zoom can be used to show precisely where a measurement is being taken. This function can be useful for measuring along horizontal surfaces (e.g., an outdoor storm drain in a parking lot), as it can be difficult to place a conventional laser trace accurately.

Those skilled in the art can appreciate that the absence of one or more pieces of input data (e.g., an area where there is no drain 206, or in which the drain 206 may be self-contained, dumped, or trapped) can affect the processing of the risk spill assessment algorithm (see below), which may result in excluding a corresponding risk facet from the analysis (e.g., "N/A" may appear as the corresponding risk phrase for "Drain Condition").

At step 104, the input data collected at step 102 can be input into a computer-implemented risk spill assessment algorithm, which calculates various risk facet values associated with potential liquid spill risks in the area 202.

At step 106, an initial calculation for spill reach can be calculated for the largest capacity container 204. In certain embodiments, a spill class is applied to the overall algorithm, depending on the size of the largest container 204. This spill class allows for more specific fine tuning of the underlying algorithm and its output results. Spill class embodies the knowledge that comparatively smaller containers of liquid can behave differently from comparatively larger liquid containers.

For the spill reach calculation, the algorithm may calculate multiple reaches (e.g., radii) of a spill of the largest liquid container 204 as positioned in the area 202. These multiple radii may be based on hypothetical spills on surfaces of zero, one, and five degrees of slope, for example, and may account for the permeability of the underlying substrate (e.g., impermeable sealed concrete vs. permeable soil). Unless a specific liquid type is specified, the base case is that the algorithm uses the physical characteristics of mineral oil as the spilled liquid, as mineral oil reflects common center-lined characteristics of the types of liquids used and spilled in facilities. For example, mercury has notably different physical characteristics, but as a practical matter is usually never spilled in quantity.

The algorithm has the capability to calculate spill reach given a change in various physical characteristics. For high-tolerance applications, these physical characteristics can be modified to reflect the actual liquid used in the examined area. It can be seen that various risks calculated by the algorithm can be derived from the calculation of multiple spill reaches which can be used in different capacities to bound risks.

With regard to step 106, calculate initial spread time $TV_s = 0.023462 * ((\text{Gravity at sea level, as ft./sec}^2)*(\text{Volume of largest container/spill, as gal})*(\text{Density of liquid, as lb./ft}^3)/(\text{Surface tension of liquid, as dyne/cm})$. Then calculate $L_2 = ((\text{Surface tension of liquid, as dyne/cm})*(\text{Volume of largest container/spill, as gal}, LRG_{current})*(\text{Initial spread time, } TV_s)/(\text{Viscosity of liquid, as centipoise}))^{1/4}$. Next, calculate maximum spill diameter (spill reach) on flat surface, $SD_0 = ((L2)*1.413142)*2$. Then calculate spill reach on flat surface using margin of safety coefficient, $CSD_0 = (SD_0)*2$; calculate spill reach on one-degree incline, $CSD_1 = (CSD_0)*2.4$; and, calculate spill reach on five-degree incline, $CSD_5 = (CSD_0)*3.2$.

At step 108, the algorithm can be programmed to calculate various risk facets associated with the area 202. These risk facets 108 include, for example and without limitation, calculated or determined values associated with area drain, area liquid, response pressure, spill kit capacity, spill kit distance, spill kit visibility, blocker distance, blocker visibility, and drain condition.

At step 108A, an area drain risk facet calculation can be performed. This facet value is the expansion of the previously calculated spill reach on one-degree incline ($CSD_1$) as compared to the distance from the liquid area to the nearest drain or escape point ($DTD_{current}$). This facet 108A represents the risk that a spill of the largest volume container 204 in a given area 202 could reach the nearest drain 206 or escape point if unimpeded by responders. First, calculate initial area drain risk distance coefficient, $ADR_{dc}=(DTD_{current})/CSD_1$ with theoretical minimum is set at 0. Next, apply logic evaluation of $ADR_{dc}$ on an area drain risk spectrum to generate an area drain risk phrase. In order to create a risk spectrum which is useful, the function assigns risk levels based on tiers of $ADR_{dc}$ values, including the following examples of $ADR_{dc}$ values which can be assigned to a corresponding area drain risk phrase:

$ADR_{dc}$ of 0 to 0.167, "Critical"
$ADR_{dc}$ of 0.168 to 0.334, "Very High"
$ADR_{dc}$ of 0.335 to 0.501, "High"
$ADR_{dc}$ of 0.502 to 0.668, "Elevated"
$ADR_{dc}$ of 0.669 to 1, "Moderate"
$ADR_{dc}$ of 1.01 and above, "Lower"

Next, step 108A may solve for distance from liquid area to nearest drain/escape to reach a "Lower" area drain risk level. Because a key output of the algorithm is to create specific, prescriptive, physical improvements to an area, a minimum distance from liquid area to nearest drain/escape can be calculated to achieve the "Lower" area drain risk phrase (DTDLower), wherein $DTD_{Lower}=1.01*CSD_1$.

At step 108B, an area liquid risk facet calculation can be performed. Categorically, there are a few factors at play when determining the risks presented by the liquids in a given area: danger to personnel and settings presented by a single type of liquid by itself; multiple types of liquids representing additional complexity within a class of liquids (e.g., multiple types of liquids within the class "Corrosives" in a given liquid area); and, the added complexity and danger represented by an area containing multiple and distinct classes of liquids, each requiring a specific and unique response. Calculating the area liquid risk facet 108B may first involve compiling types of liquids. For each type of liquid noted (e.g., $TYP_1$, $TYP_2$, $TYP_3$, etc.), assign a corresponding value of 1. Next, compile types of liquids into larger classes and capture in-class response difficulty (i.e., ICD), a coefficient reflecting the relative complexity of responding to a spill of that liquid class, when considered in isolation. For example, responding to a single water-based spill is relatively straightforward compared to a spill of a corrosive, due to the added dangers, incompatibilities, and specialized supply selection required to respond to a corrosive spill:

| Liquid Type | Liquid Class | ICD |
| --- | --- | --- |
| Water-based | Water Based | 1 |
| Oils, Oil-based | Oil Based | 1 |
| Aromatic Solvents | Flammables | 2 |
| Fuels | Flammables | 2 |
| Flammables | Flammables | 2 |
| Corrosives | Corrosives | 3 |
| Oxidizers | Oxidizers | 3 |
| Other | Other | 2 |

Then, as part of step 108B, total class complexity (TCC) can be compiled. TCC is a coefficient reflecting the compounded complexity a responder would face when responding to a spill of an as-yet unidentified liquid, which could conceivably be of any of the classes of liquids within an area. For example, two commonly used liquids in industry are water and sulfuric acid. If those two liquids are used in the same area, there is significant personnel risk resulting from those liquids being confused, as they are both clear and relatively odorless. The potential for confusion of two liquid classes is further compounded in the case of large spills presenting high mental pressure or cognitive load, which can be accounted for in the response pressure risk facet (see below). Examples of TCC values include the following:

| Number of Liquid Classes present | TCC |
| --- | --- |
| 1 | 1 |
| 2 | 1.4 |
| 3 | 1.8 |
| 4 | 2.2 |
| 5 | 2.6 |
| 6 | 3 |

Next, step 108B may involve calculating an area liquid risk coefficient as follows: $ALR_c=TCC*((ICD_1*TYP_1)+(ICD_2*TYP_2)+(ICD_3*TYP_3)+(ICD_4*TYP_4)+(ICD_5*TYP_5)+(ICD_6*TYP_6))$. Logic evaluation of $ALR_c$ on an area liquid risk spectrum can be performed to create an area liquid risk phrase. Examples of $ALR_c$ values and their corresponding area liquid risk phrases include the following:

$ALR_c$ of 45 and above, "Critical"
$ALR_c$ of 30 to 44.99, "Very High"
$ALR_c$ of 10 to 29.99, "High"
$ALR_c$ of 3 to 9.99, "Elevated"
$ALR_c$ of 2 to 2.99, "Moderate"
$ALR_c$ of 1 to 1.99, "Lower"

At step 108C, a response pressure risk facet calculation can be performed. Because the algorithm can be used to model the risks present before and during spill response for a given liquid area, the human factor is significant. Response pressure is a synthesis of area drain risk ($ADR_{dc}$) and Area Liquid Risk ($ALR_c$), indexing and normalizing each to a 100-point scale, as they use separate coefficient scales in their respective calculations. Response pressure reflects the further compounded risk represented by liquids more dangerous to personnel being located at distances closer to drains. This reflects the reality that as liquids are more likely to reach a drain ($ADR_{dc}$), personnel have less time to respond and experiences higher cognitive load and stress. If personnel have little time to respond, and there are multiple classes of harmful liquids in the area ($ALR_c$), this represents high potential for personnel to misidentify a dangerous liquid while under time pressure.

To calculate the response pressure risk facet at step 108C, a risk pressure coefficient ($RP_c$) can be calculated as follows: $RP_c=(100*(ALR_c/45)+((1-ADR_{dc})*100)$. Next, logic evaluation of $RP_c$ can be performed to create a response pressure risk phrase $RP_c$ as follows:

$RP_c$ of 175 and above, "Critical"
$RP_c$ of 117 to 174.99, "Very High"
$RP_c$ of 47 to 116.99, "High"
$RP_c$ of 6.60 to 46.99, "Elevated"
$RP_c$ of 0 to 6.59, "Lower"

At step 108D, a spill kit capacity risk facet calculation can be performed. This facet considers the ability of the nearest spill kit to absorb and retain a spill of the largest container in a given area. It also accounts for higher area drain risk requiring marginally higher absorbent capacity, such as when responders are faced with high pressure and little time, absorbent placement may be neither optimal nor perfectly efficient. As part of step 108D, logic evaluation of spill kit absorbency ($SKA_c$) for area drain risk ($ADR_{dc}$) can be determined as follows:

| $ADR_{dc}$ risk phrase | $SKA_c$ |
|---|---|
| "Critical" | 1.2 |
| "Very High" | 1.1 |
| "High" | 1.05 |
| "Elevated" | 1 |
| "Moderate" | 1 |
| "Lower" | 1 |

Next, a spill kit absorbency coefficient ($SKC_c$) can be calculated as $SKC_c=(SKC_{current}/LRG_{current})/SKA_c$. Logic evaluation of $SKC_c$ on a spill kit absorbency spectrum can be performed to create a spill kit absorbency risk phrase, examples of which follow:

$SKC_c$ of 1.001 and above, "Excellent"
$SKC_c$ of 0.751 to 1.00, "Very Good"
$SKC_c$ of 0.501 to 0.750, "Good"
$SKC_c$ of 0.301 to 0.500, "Borderline"
$SKC_c$ of 0 to 0.300, "Not Acceptable"

At step 108E, a spill kit distance risk facet calculation can be performed. This facet considers the realities of spill kit placement, and how near a liquid area a spill kit should be in order to respond effectively to a spill of the largest container. This facet also takes into account two additional factors. First, it builds on five distinct spill classes, as the relationship between the volume of the largest container in an area ($LRG_{current}$) and distance to spill kit ($DTK_{current}$) is not linear. For example, a lab area with a one-liter largest container realistically can locate a very small spill kit a variety of places in that lab. In the case of a 20,000-gallon tank, however, the ratio of volume to distance needs significant adjustments to account for the far larger scale of spill and facility. Second, as response pressure ($RP_c$) increases, the spill kit distance reduction coefficient ($SKD_{rc}$) also increases. This reflects that in areas with high response pressure, spill kits should be located more closely to the liquid area. This also reflects the reality that in high pressure spill response situations, having a spill kit easily seen and accessed becomes an increasingly important aspect of effective spill response.

As part of the assessment performed at step 108E, an analyst may view photographs of the spill kit in situ, as taken from the liquid area, and select from pre-determined descriptors to characterize the path between the liquid area and the spill kit. The selection is then assigned a corresponding spill kit obstruction factor (SKO), examples of which are as follows:

| User selection based on level of obstruction between liquid area and spill kit | SKO |
|---|---|
| "Completely clear, line of sight" | 1 |
| "One obstruction or an aisle" | 1.1 |
| "A few obstructions, somewhat straight path" | 1.2 |
| "Highly obstructed" | 1.5 |
| "In a separate area or behind doors" | 2 |

Next, $DTK_{current}$ can be adjusted using the SKO to generate a more accurate adjusted distance to spill kit value ($DTK_{adj}$). Because these distances affect the time required by personnel to respond to a spill, it is useful to take them into consideration. For example, a spill kit 30 feet away with a clear line of site from the liquid storage container 204 is more likely to be remembered and utilized effectively in spill response than a spill kit which is 30 feet away that is located in another storage area. In this example, $DTK_{adj}=(DTK_{current})*(SKO)$. Also, logic evaluation of a spill kit distance reduction coefficient ($SKD_{rc}$) can be performed to generate a response pressure risk phrase ($RP_c$), such as the following:

| $RP_c$ risk phrase | $SKD_{rc}$ |
|---|---|
| "Critical" | .3 |
| "Very High" | .15 |
| "High" | .10 |
| "Elevated" | .05 |
| "Lower" | 0 |

Also, as part of step 108E, a spill kit distance coefficient can be calculated as $SKD_c=(1-MSK_c)*((DTK_{adj}/((1-SKD_{rc})*CSD_0))$. In the presence of a one-person mobile spill kit, $MSK_c$ can be 0.1, otherwise it may be zero. In certain embodiments, spill class distance coefficient $SKD_c$ or $SKD_{adj}$ can be evaluated according to the nearest fit based on the capacity of the largest container 204 ($LRG_{current}$) to designate a spill kit distance risk phrase as follows:

|  | $LRG_{current}$ of up to 5 gallons | $LRG_{current}$ of 5.01 to 55 gallons | $LRG_{current}$ of 55.01 to 330 gallons | $LRG_{current}$ of 330.01 to 2000 gallons | $LRG_{current}$ of 2000.01 to 20000 gallons |
|---|---|---|---|---|---|
| "Excellent" | 0 to 1 $SKD_c$ | 0 to .5 $SKD_c$ | 0 to .25 $SKD_c$ | 0 to 20 $SKD_{adj}$ | 0 to 10 $SKD_{adj}$ |
| "Very Good" | 1.01 to 1.5 $SKD_c$ | .501 to .7 $SKD_c$ | .251 to .35 $SKD_c$ | 20.01 to 40 $SKD_{adj}$ | 10.01 to 20 $SKD_{adj}$ |
| "Good" | 1.51 to 2.5 $SKD_c$ | .701 to 1 $SKD_c$ | .351 to .45 $SKD_c$ | 40.01 to 50 $SKD_{adj}$ | 20.01 to 30 $SKD_{adj}$ |
| "Borderline" | 2.51 to 4.2 $SKD_c$ | 1.01 to 1.68 $SKD_c$ | .451 to .7 $SKD_c$ | 50.01 to 75 $SKD_{adj}$ | 30.01 to 40 $SKD_{adj}$ |
| "Not Acceptable" | 4.201 and above $SKD_c$ | 1.681 and above $SKD_c$ | .701 and above $SKD_c$ | 75.01 and above $SKD_{adj}$ | 40.01 and above $SKD_{adj}$ |

At step 108F, a spill kit visibility risk facet can be calculated. This facet may rely on analyst evaluation of the visibility of the spill kit, but does not need to rely on the subjective evaluation of the analyst. This calculation employs a photograph taken of the spill kit in situ, from which the analyst reports various points or angles of visibility. The analyst views the photograph of the spill kit in situ, as taken from the liquid container 204 location, and selects from pre-determined descriptors for what is seen. The selection is then assigned a corresponding spill kit visibility score (unadjusted), $SKV_{un}$, as follows:

| User selection based on spill kit in situ visibility | $SKV_{un}$ |
|---|---|
| "Clear visibility from 2+ points" | 5 |
| "Clear visibility from 2 points" | 4 |
| "Clear visibility from 1 point" | 3 |
| "Partial visibility from 1 point" | 2 |
| "No visibility" | 1 |

In certain embodiments, a logic evaluation can be performed to derive spill kit visibility adjusted for response pressure ($SKV_{adj}$). In cases of elevated response pressure, the algorithm may require increased visibility to achieve the same spill kit visibility risk phrase. For example, an area with a "Critical" level of response pressure might be required to have a spill kit that is more easily visible than a similar area with an "Elevated" response pressure, as responders might be assumed to be more likely to overlook a nearby kit in times of high stress or duress. Examples of values for $SKV_{adj}$ are shown in the table below:

| Response Pressure $RP_c$ | $SKV_{adj}$ |
|---|---|
| "Critical" | $(SKV_{un}) - 1$ |
| "Very High" | $(SKV_{un}) - 1$ |
| "High" | $SKV_{un}$ |
| "Elevated" | $SKV_{un}$ |
| "Lower" | $SKV_{un}$ |

Also as part of step 108F, logic evaluation of $SKV_{adj}$ on a spill kit visibility risk spectrum can be performed to generate a spill kit visibility risk phrase ($SKV_c$), as shown in the following examples:

| $SKV_{adj}$ | $SKV_c$ risk phrase |
|---|---|
| 5 | "Excellent" |
| 4 | "Very Good" |
| 3 | "Good" |
| 2 | "Borderline" |
| 1, 0 | "Not Acceptable" |

At step 108G, a blocker distance risk facet can be calculated. This facet considers the realities of drain blocker/drain sealing apparatus 210 placement, and how near a drain 206 a blocker 210 should be in order to respond effectively to a spill of the largest container 204. This facet may consider additional factors. First, it can build on five distinct spill classes, as the relationship between the volume of the largest container in an area ($LRG_{current}$) and distance from drain to blocker ($DTB_{current}$) is not linear. Second, as Response Pressure ($RP_c$) increases, the drain blocker distance reduction coefficient ($DTB_{rc}$) also increases, reflecting that in areas with high response pressure, blockers should be located more closely to the drain in a liquid storage area. This reflects the reality that in high pressure spill response situations, having a drain blocker easily seen and accessed becomes an increasingly acute and significant benefit.

As part of the processing at step 108G, an analyst may view a photograph of the blocker in situ, as taken from the drain 206 or escape point, and then select from pre-determined descriptors to characterize the path between the drain 206 and the blocker 210. The selection is then assigned a corresponding blocker obstruction factor (BO), examples of which are as follows:

| User selection based on level of obstruction between drain/escape point and blocker | BO |
|---|---|
| "Completely clear, line of sight" | 1 |
| "One obstruction or an aisle" | 1.1 |
| "A few obstructions, somewhat straight path" | 1.2 |
| "Highly obstructed" | 1.5 |
| "In a separate area or behind doors" | 2 |

$DTB_{current}$ can be adjusted by using the BO to result in the more accurate adjusted distance to spill kit value ($DTB_{adj}$). Because these distances affect the response time of personnel during a spill event, it is useful to take them into consideration. This adjustment can be calculated as $DTB_{adj} = (DTB_{current})*(BO)$. Next, logic evaluation of blocker distance reduction coefficient ($DTB_{rc}$) in connection with generating a response pressure risk phrase ($RP_c$), as shown in the following examples:

| $RP_c$ risk phrase | $DTB_{rc}$ |
|---|---|
| "Critical" | .3 |
| "Very High" | .15 |
| "High" | .10 |
| "Elevated" | .05 |
| "Lower" | 0 |

A blocker distance coefficient ($DTB_c$) can be calculated as $DTB_c = DTB_{adj}/((1-DTB_{rc})*CSD_0))$. Logic evaluation can be performed for $DTB_c$ or $DTB_{adj}$ according to the nearest fit based on capacity of largest container ($LRG_{current}$) to designate a blocker distance risk phrase, as shown in the following examples:

| | $LRG_{current}$ of up to 5 gallons | $LRG_{current}$ of 5.01 to 55 gallons | $LRG_{current}$ of 55.01 to 330 gallons | $LRG_{current}$ of 330.01 to 2000 gallons | $LRG_{current}$ of 2000.01 to 20000 gallons |
|---|---|---|---|---|---|
| "Excellent" | 0 to 1 $DTB_c$ | 0 to .5 $DTB_c$ | 0 to .25 $DTB_c$ | 0 to 20 $DTB_{adj}$ | 0 to 10 $DTB_{adj}$ |
| "Very Good" | 1.01 to 1.5 $DTB_c$ | .501 to .7 $DTB_c$ | .251 to .35 $DTB_c$ | 20.01 to 40 $DTB_{adj}$ | 10.01 to 20 $DTB_{adj}$ |
| "Good" | 1.51 to 2.5 $DTB_c$ | .701 to 1 $DTB_c$ | .351 to .45 $DTB_c$ | 40.01 to 50 $DTB_{adj}$ | 20.01 to 30 $DTB_{adj}$ |
| "Borderline" | 2.51 to 4.2 $DTB_c$ | 1.01 to 1.68 $DTB_c$ | .451 to .7 $DTB_c$ | 50.01 to 75 $DTB_{adj}$ | 30.01 to 40 $DTB_{adj}$ |

-continued

| | $LRG_{current}$ of up to 5 gallons | $LRG_{current}$ of 5.01 to 55 gallons | $LRG_{current}$ of 55.01 to 330 gallons | $LRG_{current}$ of 330.01 to 2000 gallons | $LRG_{current}$ of 2000.01 to 20000 gallons |
|---|---|---|---|---|---|
| "Not Acceptable" | 4.201 and above $DTB_c$ | 1.681 and above $DTB_c$ | .701 and above $DTB_c$ | 75.01 and above $DTB_{adj}$ | 40.01 and above $DTB_{adj}$ |

At step 108H, a blocker visibility risk facet calculation can be made. While this facet may rely on analyst evaluation of the visibility of the blocker, it does not necessarily rely on subjective evaluation by the analyst. This calculation may be based on a photograph taken of the blocker in situ, from which the analyst reports points or angles of visibility. The analyst may view the photograph of the blocker in situ, as taken from the drain/escape point, and then select from pre-determined descriptors for what is seen. The selection is then assigned a corresponding Blocker Visibility score (unadjusted), $BV_{un}$, examples of which are as follows:

| User selection based on blocker in situ visibility from drain/escape point | $BV_{un}$ |
|---|---|
| "Clear visibility from 2+ points" | 5 |
| "Clear visibility from 2 points" | 4 |
| "Clear visibility from 1 point" | 3 |
| "Partial visibility from 1 point" | 2 |
| "No visibility" | 1 |

Next, logic evaluation can be performed to derive blocker visibility adjusted for response pressure ($BV_{adj}$). In cases of elevated response pressure, the algorithm may require increased visibility to achieve the same blocker visibility risk phrase. For example, an area with a "Critical" level of response pressure might be required to have a blocker that is more easily visible than a similar area with an "Elevated" response pressure, as responders may be assumed to be more likely to overlook a nearby blocker in times of high stress or duress. Examples of BVadj are shown in the following table:

| Response Pressure RPc | $BV_{adj}$ |
|---|---|
| "Critical" | $(BV_{un}) - 1$ |
| "Very High" | $(BV_{un}) - 1$ |
| "High" | $BV_{un}$ |
| "Elevated" | $BV_{un}$ |
| "Lower" | $BV_{un}$ |

Logic evaluation of $BV_{adj}$ can be performed on a blocker visibility risk spectrum to generate a blocker visibility risk phrase ($BV_c$), as follows:

| $BV_{adj}$ | $BV_c$ risk phrase |
|---|---|
| 5 | "Excellent" |
| 4 | "Very Good" |
| 3 | "Good" |
| 2 | "Borderline" |
| 1, 0 | "Not Acceptable" |

At step 108I, a drain condition risk facet may be determined. This may be a subjective, non-calculated facet based on the analyst's experience to judge the likelihood of a urethane panel to be able to cover and seal the drain 206 as shown in the photograph. This judgment may be based on the smoothness and uniformity of the surface surrounding the drain 206 grate, for example, as this is the sealing interface for many commonly available drain sealing or spill diverting solutions.

Figure 4:
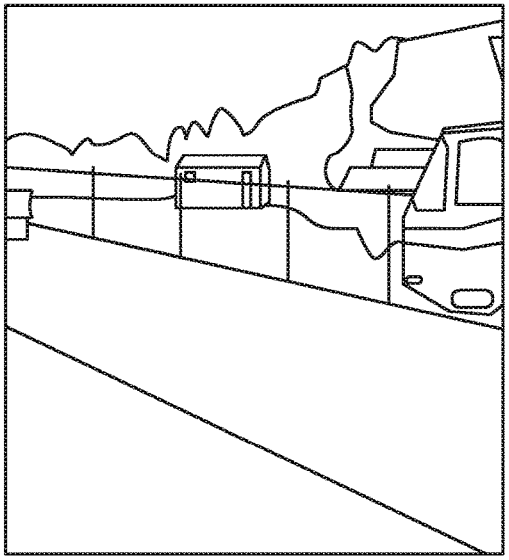
FIG. 4 illustrates an example of an output screen representing a spill risk assessment performed in connection with the area of FIG. 2.

At step 110, a summary of the various risk facet calculations and determinations made in accordance with step 108 can be aggregated and displayed on an output screen. FIG. 4 illustrates an example of an output screen representing a spill risk assessment performed in connection with the area 202 shown in FIG. 2.

Figure 11:
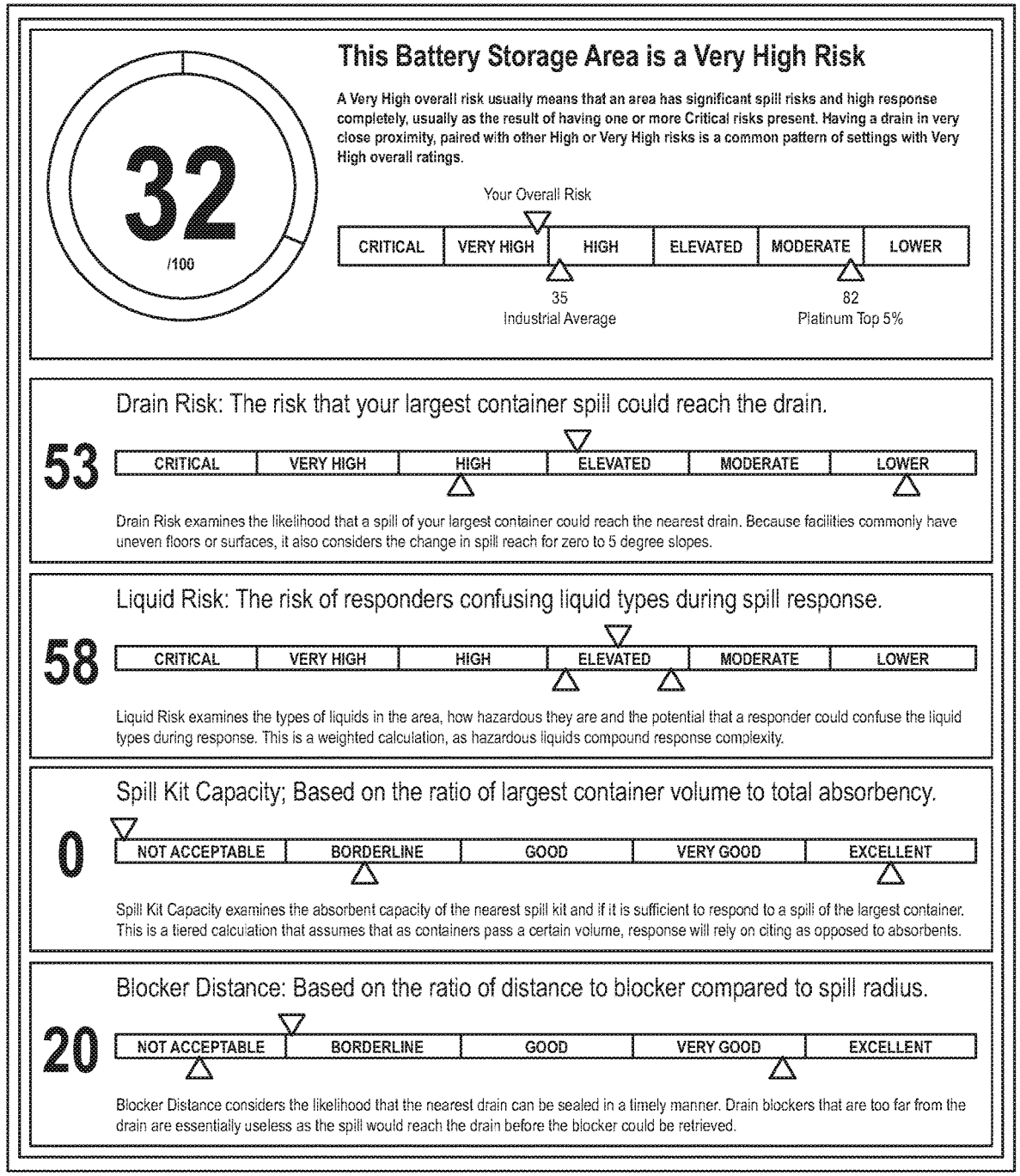
FIG. 11 illustrates an example of an online version of an output screen having numerical risk ratings associated with various risk facets.

Further examples of input data, calculations, and determinations of spill risk assessments are provided in FIGS. 5A through 12. FIGS. 5A, 6A, 7A, 8A and 9A include a tabulation of input data and calculated values associated with various liquid storage areas (e.g., Sample Area 1 through Sample Area 5, respectively). FIGS. 5B, 6B, 7B, 8B and 9B include output screen displays illustrating the results of the calculated values associated with each storage area in FIGS. 5A, 6A, 7A, 8A and 9A (respectively). FIG. 10 includes an example of an output screen associated with a fueling and rail area. FIG. 11 illustrates an example of an online version of an output screen having numerical risk ratings associated with various risk facets. FIG. 12 illustrates an example of an output screen associated with a parts washer area in a building.

At step 112, one or more improvement path recommendations can be calculated to provide specific and prescriptive recommendations. In certain embodiments, improvement path recommendation calculations can be performed by solving for each of the earlier risk calculations to achieve the lowest possible risk assessment without effecting "major" changes to the area 202 or its infrastructure. For example, moving a physical drain is rarely feasible and would in most cases constitute a "major" change to the area 202.

With regard to improvement path calculations for the area drain risk facet, the facility would take every feasible physical measure to reduce drain risk in an area, including having drain sealing apparatus and spill response supplies appropriately located, resulting in an overall area drain risk of "Lower".

With regard to improvement path determination for response pressure, this calculation reflects the "Lower" area drain risk resulting from the adoption of the full improvement path recommendations, and averages it with an unadjusted area liquid risk to reflect the new response pressure for the improved area ($RP_{post}$). Because area drain risk is set to "Lower" it has a value of zero which is averaged with area liquid risk and then indexed to a 100-point scale: $RP_{ip} = (0 + (100*(ALR_c/45))$. Next, logic evaluation of RPip can be performed to generate a post-improvement path response pressure risk phrase ($RP_{post}$), as follows:

| $RP_{ip}$ | $RP_{post}$ risk phrase |
|---|---|
| 175 and above | "Critical" |
| 117 to 174.99 | "Very High" |
| 47 to 116.99 | "High" |
| 6.6 to 46.99 | "Elevated" |
| 0 to 6.59 | "Lower" |

In certain embodiments, determining an improvement path for spill kit capacity reflects the optimal spill kit absorbency for a given area, the minimum absorbency that will reach the "Excellent" risk phrase for spill kit capacity. The base absorbency necessary to achieve an "Excellent" spill kit capacity rating ($SKC_{ip}$) can be calculated for the largest container ($LRG_{current}$), while accounting for a higher area drain risk requiring marginally higher absorbent capacity ($SKA_c$). Therefore, spill kit capacity rating for the improvement path can be calculated as $SKC_{ip} = (SKA_c*LRG_{current})+1$. In certain aspects, $SKC_{ip}$ can be adjusted by a selected class absorbency factor (CAF) to reflect the expected maximum absorbency provided by spill kit in the event of a spill of the largest container, as follows:

| $LRG_{current}$ | CAF |
|---|---|
| Up to 5 gal | 100% |
| 5.01 to 55 gal | 100% |
| 55.01 to 330 gal | 100% |
| 330.01 to 2000 gal | 50% |
| 2000.01 to 20000 gal | Cap at 1000 gallons total absorbency maximum |

Next, a recommended single spill kit capacity per area ($SKC_{post}$) can be calculated. Where the recommended $SKC_{post}$ absorbency exceeds that available in a single spill kit, supplemental cavalry absorbency ($CA_{post}$) can be calculated by subtracting $SKC_{post}$ from maximum single spill kit absorbency ($MAX_{sk}$). In the situation where $LRG_{current}>2000$, then $SKC_{post}=1000$; where $LRG_{current}<=2000$, then $SKC_{post}=(SKC_{ip}*CAF)$; and, where $SKA_{post}>MAX_{sk}$, then $CA_{post}=SKA_{post}-MAX_{sk}$.

With regard to determining the improvement path for spill kit distance, this calculation reflects the maximum optimal distance the spill kit should be located from the liquid storage area while still achieving an "Excellent" risk phrase for spill kit distance. This recommended distance is described as $SKD_{post}$. In cases where Cavalry Absorbency ($CA_{post}$) is required, its maximum distance from the liquid area while still reaching a corresponding "Excellent" risk phrase can be described as $CAD_{post}$. The following is an example of logic evaluation of $LRG_{current}$ to obtain corresponding $SKD_{exc}$ value:

| | $LRG_{current}$ of up to 5 gallons | $LRG_{current}$ of 5.01 to 55 gallons | $LRG_{current}$ of 55.01 to 330 gallons | $LRG_{current}$ of 330.01 to 2000 gallons | $LRG_{current}$ of 2000.01 to 20000 gallons |
|---|---|---|---|---|---|
| "Excellent" | 1 | .5 | .25 | 20 | 10 |

Calculation of maximum spill kit distance from liquid area to achieve "Excellent" risk phrase ($SKD_{post}$) can be provided as: where $LRG_{current}<=330$, then $SKD_{post}=1-(SKD_{rc}-MSK_c)*(CSD_0*SKD_{exc})$; and, where $LRG_{current}>330$, then $SKD_{post}=SKD_{exc}$. Calculation of maximum perimeter distance of cavalry absorbency ($CA_{post}$) to achieve "Excellent" risk phrase for spill kit distance equivalent for cavalry absorbency ($CAD_{post}$) can be provided as: where $CA_{post}>0$, then $CAD_{post}=CSD_5$.

Regarding the improvement path calculation for spill kit visibility, this calculation reflects the points of visibility to be added ($SKV_{ptadd}$) to the current spill kit points of visibility ($SKV_{ptcurr}$) to reach the "Excellent" risk phrase for spill kit visibility ($SKV_{ip}$). First, $SKV_{ptpost}$ can be set to a value corresponding to "Excellent" risk phrase (e.g., $SKV_{ptpost}=3$). Next, logic evaluation of $SKV_{adj}$ can be performed to derive current points of visibility ($SKV_{ptcurr}$), as follows:

| SKVptcurr | SKVadj |
|---|---|
| 3 | 5 |
| 2 | 4 |
| 1 | 3 |
| 1 | 2 |
| 0 | 1 |

Then, calculation of additional points of visibility to be added to current spill kit visibility ($SKV_{ptadd}$) can be conducted to achieve an "Excellent" risk phrase for spill kit visibility (SKVip). This can be calculated as $SKV_{ptadd}=SKV_{ptpost}-SKV_{ptcurr}$.

Improvement Path calculation for blocker distance reflects the maximum optimal distance the blocker 210 should be located from the drain 206 or escape point while still achieving the "Excellent" risk phrase for blocker distance ($DTB_{exc}$). This recommended distance is described as $DTB_{post}$. Logic evaluation of $LRG_{current}$ to obtain a corresponding $DTB_{exc}$ value can be conducted as follows:

| | $LRG_{current}$ of up to 5 gallons | $LRG_{current}$ of 5.01 to 55 gallons | $LRG_{current}$ of 55.01 to 330 gallons | $LRG_{current}$ of 330.01 to 2000 gallons | $LRG_{current}$ of 2000.01 to 20000 gallons |
|---|---|---|---|---|---|
| "Excellent" | 1 | .5 | .25 | 20 | 10 |

Calculation of maximum blocker distance from liquid storage area to achieve "Excellent" risk phrase ($DTB_{post}$) can be performed while also considering the effect of distance reduction for higher levels of response pressure ($DTB_{rc}$): where $LRG_{current}<=330$, then $DTB_{post}=(1-(DTB_{rc}))*(CSD_0*DTB_{exc})$; and, where $LRG_{current}>330$, then $DTB_{post}=DTB_{exc}$.

The improvement path calculation for blocker visibility reflects the points of visibility to be added ($BV_{ptadd}$) to the current blocker number of points of visibility ($BV_{ptcurr}$) to reach the "Excellent" risk phrase for Blocker Visibility ($BV_{ip}$). First, set $BV_{ptpost}$ to value corresponding to "Excellent" risk phrase (e.g., $BV_{ptpost}=3$). Then, logic evaluation of $SKV_{adj}$ can be applied to derive current points of visibility ($SKV_{ptcurr}$), as follows:

| $BV_{ptcurr}$ | $BV_{adj}$ |
|---|---|
| 3 | 5 |
| 2 | 4 |
| 1 | 3 |
| 1 | 2 |
| 0 | 1 |

Calculation of additional points of visibility to be added to current blocker visibility ($BV_{ptadd}$) can be performed to reach "Excellent" risk phrase for Blocker Visibility ($BV_{ip}$). Therefore, $BV_{ptadd}=BV_{ptpost}-BV_{ptcurr}$.

An improvement path calculation for drain condition creates specific directions based on the earlier analyst view of the ability of the drain 206 to be sealed liquid-tight with a urethane panel, for example. In essence, when the analyst observes an eroded sealing surface and assigns a "Borderline" risk phrase for Drain Condition, then the corresponding improvement path for drain condition may read: "Consider leveling drain surface with epoxy; keep the drain surrounds clear and free of debris and gravel to allow liquid-tight sealing of drain" or an equivalent instruction.

Figure 13:
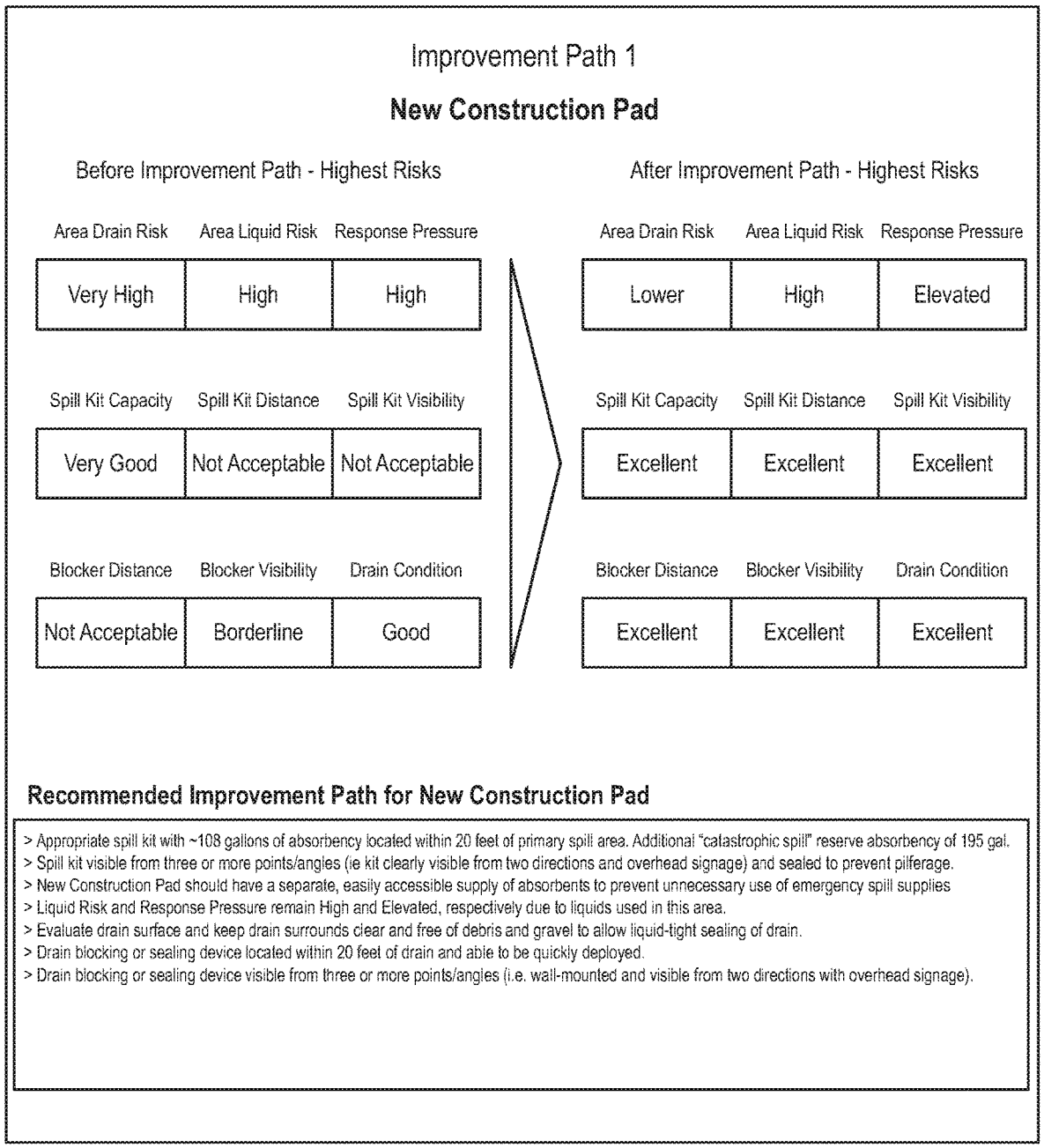
FIGS. 13 and 14 illustrate example output screens associated with developing improvement paths for certain examples of liquid storage areas.
Figure 14:
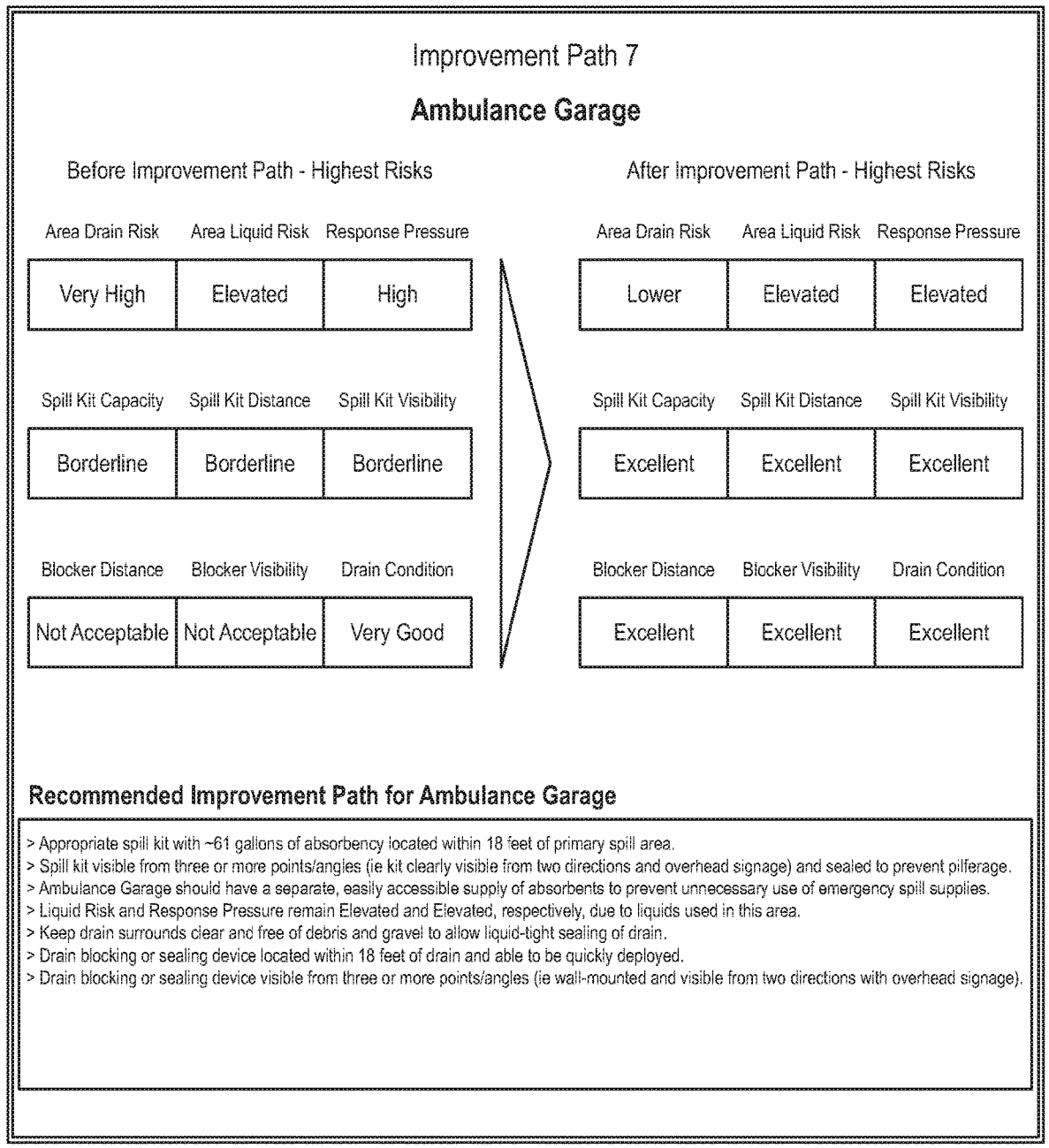

FIGS. 13 and 14 illustrate example output screens associated with developing improvement paths with particular liquid storage areas. It can be seen that these screens display risk assessments before and after the improvement path has been implemented in the area. FIG. 15 includes an example of an output screens associated with developing improvement paths with a particular liquid storage area, including a numerical count of risk facets both before and after the improvement path has been implemented.

Figure 16:
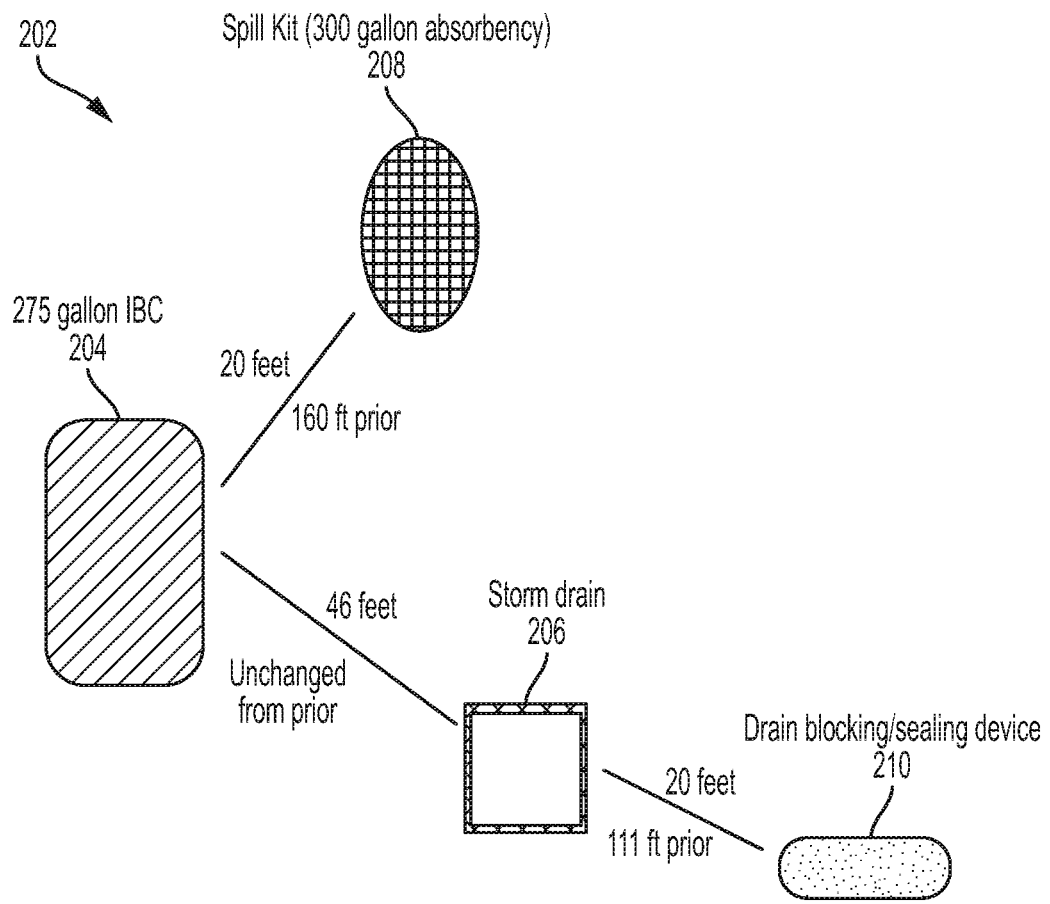
FIG. 16 schematically displays physical transformations and modifications to the storage area of FIG. 2 after an improvement path has been implemented.

At step 114, the liquid storage area 202 may be transformed in accordance with recommendations developed by performing the above spill risk assessments. As shown in FIG. 16, various elements of the area 202 have been physically moved or modified in response to performing the assessment. For example, a spill kit with an appropriate level of absorbency has been positioned within 20 feet of the largest capacity liquid storage container 204. In another example, the drain blocker 210 has been moved to within 20 feet of the drain 206. It can be seen that no "major" changes to the area 202 were recommended, such as moving the drain 206 or moving the location of the storage container 204, for example.

Figure 17:
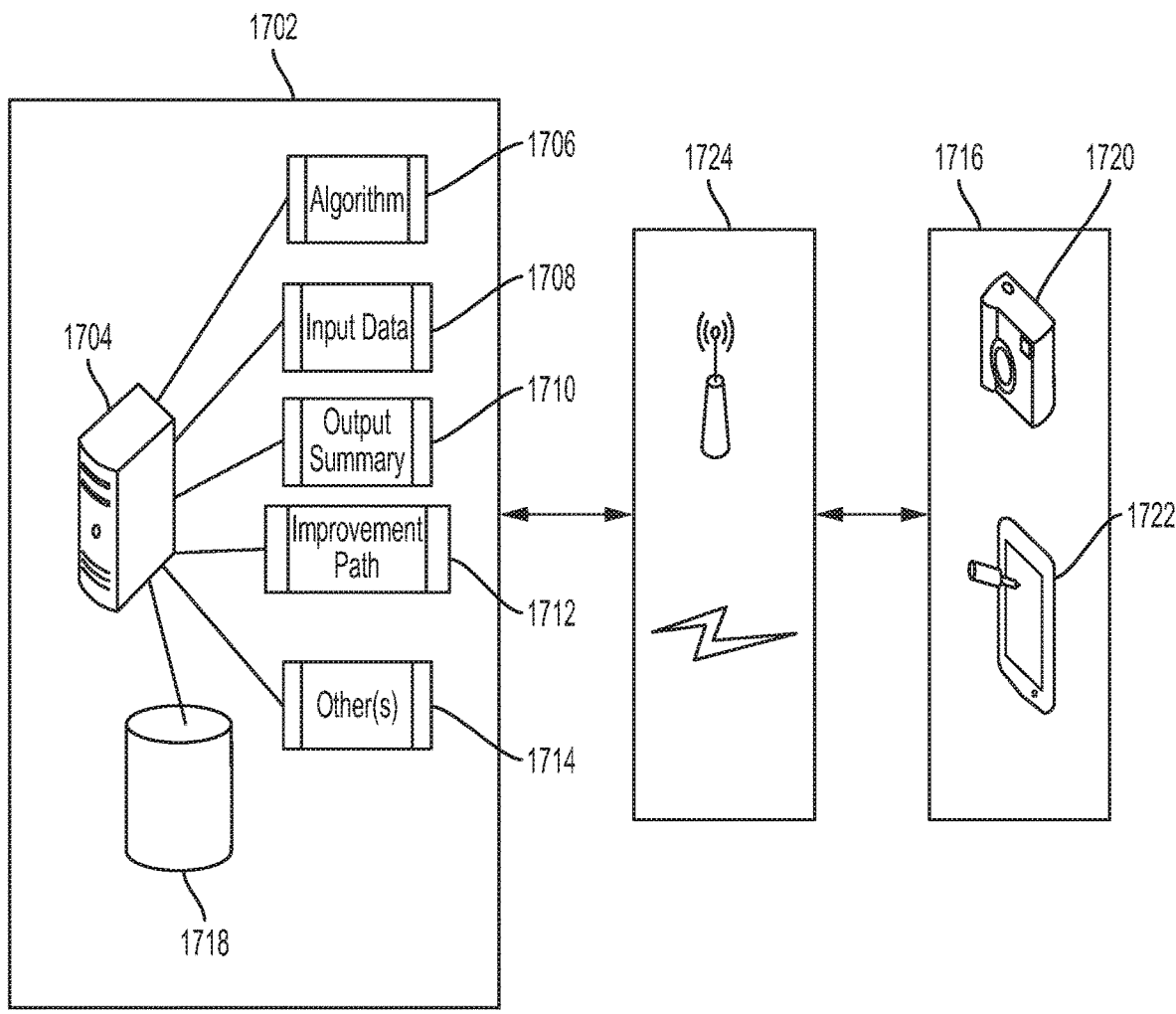
FIG. 17 includes an example of a computer system architecture in which various input data, calculations, and algorithms can be executed in association with various spill risk assessment embodiments described herein.

FIG. 17 includes an example of a computer system architecture in which various input data, calculations, and determinations can be executed in association with various spill risk assessment embodiments described herein. In the example shown, a spill risk assessment system 1702 may include a computer processor (e.g., server 1704) and various modules 1706-1714 which perform various tasks or provide functionality within the system 1702. For example, an algorithm module 1706 may be programmed to perform various risk facet calculations. An input data module 1708 may be programmed to receive, process, and/or store data collected or derived from a given liquid storage area 1716. An output summary module 10 may be provided to generate and display summaries of calculations performed by the spill risk assessment algorithm. In another example, an improvement path module 1712 may be programmed to perform improvement path calculations. It can be appreciated that one or more other modules 1714 might also be provided in the system 1702 to execute various tasks. The system 1702 may also be operatively associated with one or more suitable electronic data storage media 1718 for retaining or accessing data such as risk assessment data.

In certain aspects, one or more measurement devices 1720 (e.g., laser-based devices) may be employed within the area 1716 to capture input data. Likewise, various types of data input devices 1722 (e.g., mobile devices, computers, laptops. etc.) may be employed within the area to collect and transmit data to the system 1702. In various embodiments, communications between the system 1702 and devices 1720, 1722 used within the area 1716 can be enabled through a variety of communication media or communication means 1724 (e.g., Internet, intranet, VPN, wireless, etc.)

The examples provided herein are provided merely for the purpose of illustrating the various potential embodiments of the present invention. No particular aspect of a given screen display, output screen, schematic, or flow chart is necessarily intended to limit the scope of the present invention.

In various embodiments, various modules or platforms can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent, and/or semi-temporary, including non-transitory varieties thereof. Memory and/or storage components may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to operation of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, hardware, and/or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Additionally, it can be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flow charts and methods described herein show the functionality and operation of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Whereas particular embodiments of this invention have been described above for purposes of illustration, it will be evident to those skilled in the art that numerous variations of the details of the present invention may be made without departing from the invention.

What is claimed is:

1. A method for modifying at least one physical aspect of a liquid storage area having at least one liquid storage container stored therein, the method comprising:
    identifying a current arrangement of the liquid storage area including identifying physical objects and structures in the liquid storage area, the physical objects and structures comprising at least one of a storage container, a drain, or a spill kit, or a combination thereof;
    assessing risk for the liquid storage area associated with a liquid spill in association with the identified current physical arrangement, wherein assessing the risk comprises:
        receiving, by a computer system having a processor, input data associated with a largest capacity liquid storage container identified in the liquid storage area, and
        applying, by the processor, a computer-implemented algorithm programmed for:
            calculating a spill reach value for the largest capacity container in response to a type of fluid stored in the largest capacity container and a fluid viscosity value,
            calculating at least one risk facet value associated with the liquid storage area, including calculating at least one risk facet value comprising an area drain risk value in response to:
                a distance from the largest capacity container to a drain or escape point nearest to the largest capacity container, and,
                a surface slope between the largest capacity container and the nearest drain or escape point, and,
            outputting, by the processor, a risk assessment summary associated with at least the calculated spill reach value and the calculated risk facet value; and
    physically modifying at least one of the physical objects or structures in the liquid storage area in response to at least one aspect of the risk assessment summary.

2. The method of claim 1, further comprising:
    determining, by the processor, an improvement path in response to the calculated spill reach value and the calculated risk facet value; and,
    physically modifying at least a portion of the liquid storage area in response to at least a portion of the determined improvement path.

3. The method of claim 1, further comprising the algorithm programmed for calculating multiple spill reach values for the largest capacity container in response to multiple surface slopes.

4. The method of claim 1, further comprising the algorithm programmed for calculating multiple spill reach values for the largest capacity container in response to a type of fluid.

5. The method of claim 1, further comprising the algorithm programmed for calculating at least one risk facet value comprising an area liquid risk value.

6. The method of claim 1, further comprising the algorithm programmed for calculating at least one risk facet value comprising a response pressure value.

7. The method of claim 1, further comprising the algorithm programmed for calculating at least one risk facet value comprising a spill kit capacity value.

8. The method of claim 1, further comprising the algorithm programmed for calculating at least one risk facet value comprising a spill kit distance value.

9. The method of claim 1, further comprising the algorithm programmed for calculating at least one risk facet value comprising a spill kit visibility value.

10. The method of claim 1, further comprising the algorithm programmed for calculating at least one risk facet value comprising a blocker distance value.

11. The method of claim 1, further comprising the algorithm programmed for calculating at least one risk facet value comprising a blocker visibility value.

12. The method of claim 1, further comprising the algorithm programmed for calculating at least one risk facet value comprising a drain condition determination.

13. A computer system programmed for assisting with a method process of modifying at least one physical aspect of a liquid storage area having at least one liquid storage container stored therein, the system comprising:

an electronic computer apparatus programmed for:

receiving input data associated with a current arrangement of the liquid storage area including physical objects and structures in the liquid storage area, the physical objects and structures comprising at least one of a storage container, a drain, or a spill kit, or a combination thereof, and, assessing risk for the liquid storage area associated with a liquid spill in association with the identified current physical arrangement, wherein assessing the risk comprises:

receiving, by a processor of the computer apparatus, input data associated with a largest capacity liquid storage container identified in the liquid storage area, and executing, by the processor of the computer apparatus, a computer-implemented algorithm programmed for:

calculating a spill reach value for the largest capacity container in response to a type of fluid stored in the largest capacity container and a fluid viscosity value, and calculating at least one risk facet value associated with the liquid storage area, including calculating at least one risk facet value comprising an area drain risk value in response to:

a distance from the largest capacity container to a drain or escape point nearest to the largest capacity container, and, a surface slope between the largest capacity container and the nearest drain or escape point, and outputting, by the processor of the computer apparatus, a risk assessment summary associated with at least the calculated spill reach value and the calculated risk facet value to at least one data storage medium operatively associated with the computer apparatus, the risk assessment summary including at least one recommendation for physically modifying at least one of the physical objects or structures in the liquid storage area.

14. The system of claim 13, further comprising the computer apparatus programmed for determining an improvement path in response to the calculated spill reach value and the calculated risk facet value.

15. The system of claim 14, wherein the determined improvement path includes at least one recommendation for physically modifying at least a portion of the liquid storage area in response to at least a portion of the determined improvement path.

16. The system of claim 13, further comprising the computer apparatus programmed for executing the algorithm for calculating multiple spill reach values for the largest capacity container in response to multiple surface slopes.

17. The system of claim 13, further comprising the algorithm programmed for calculating at least one risk facet value comprising a spill kit capacity value.

18. The system of claim 13, further comprising the algorithm programmed for calculating at least one risk facet value comprising a spill kit distance value.

19. The system of claim 13, further comprising the algorithm programmed for calculating at least one risk facet value comprising a spill kit visibility value.

* * * * *